(12) United States Patent
Abraham et al.

(10) Patent No.: US 9,337,954 B2
(45) Date of Patent: May 10, 2016

(54) PROTOCOL FOR CHANNEL STATE INFORMATION FEEDBACK

(75) Inventors: Santosh Paul Abraham, San Diego, CA (US); Simone Merlin, San Diego, CA (US); Hemanth Sampath, San Diego, CA (US); Sameer Vermani, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 228 days.

(21) Appl. No.: 13/179,651

(22) Filed: Jul. 11, 2011

(65) Prior Publication Data

US 2012/0177018 A1  Jul. 12, 2012

Related U.S. Application Data

(60) Provisional application No. 61/368,348, filed on Jul. 28, 2010, provisional application No. 61/372,546, filed on Aug. 11, 2010.

(51) Int. Cl.
| | |
|---|---|
| *H04B 7/06* | (2006.01) |
| *H04L 1/16* | (2006.01) |
| *H04L 1/00* | (2006.01) |
| *H04L 5/00* | (2006.01) |
| H04W 84/12 | (2009.01) |

(52) U.S. Cl.
CPC ............ *H04L 1/0027* (2013.01); *H04B 7/0636* (2013.01); *H04L 5/0057* (2013.01); *H04L 1/1607* (2013.01); *H04W 84/12* (2013.01)

(58) Field of Classification Search
USPC .............................. 370/330, 338, 312, 395.21
See application file for complete search history.

(56) References Cited

U.S. PATENT DOCUMENTS

| 8,787,841 | B2 | 7/2014 | Ketchum et al. | |
|---|---|---|---|---|
| 2004/0008690 | A1* | 1/2004 | Kandala | 370/395.21 |
| 2006/0251015 | A1 | 11/2006 | Khan | |
| 2007/0127424 | A1 | 6/2007 | Kwon et al. | |
| 2007/0129018 | A1* | 6/2007 | Trainin et al. | 455/69 |

(Continued)

FOREIGN PATENT DOCUMENTS

| CN | 1435958 A | 8/2003 |
|---|---|---|
| CN | 1833454 A | 9/2006 |

(Continued)

OTHER PUBLICATIONS

Gong et al. "Training Protocols for Multi-User MIMO) Wireless LANs", in IEEE International Symposium on Personal Indoor Radio Communications (PIMRC), pp. 1218-1223, Sep. 2010.

(Continued)

*Primary Examiner* — Michael Thier
*Assistant Examiner* — Yaotang Wang
(74) *Attorney, Agent, or Firm* — Dang M. Vo

(57) ABSTRACT

Certain aspects of the present disclosure relate to a low-overhead method for communicating Channel State Information (CSI) feedback in Very High Throughput (VHT) wireless communications systems. The present disclosure also provides packet formats for Null Data Packet Announcement (NDPA), CSI Poll and CSI feedback. In some cases, the CSI feedback may be too large to be carried in a single Media Access Control (MAC) protocol data unit (MPDU) or a Physical Layer (PHY) protocol data unit (PPDU), and a proposed protocol for CSI feedback segmentation can be then utilized.

94 Claims, 14 Drawing Sheets

(56) References Cited

U.S. PATENT DOCUMENTS

| | | | |
|---|---|---|---|
| 2007/0195811 A1* | 8/2007 | Basson et al. | 370/441 |
| 2007/0230373 A1 | 10/2007 | Li et al. | |
| 2007/0280116 A1 | 12/2007 | Wang et al. | |
| 2009/0086656 A1* | 4/2009 | Kuchibhotla et al. | 370/310 |
| 2009/0190528 A1 | 7/2009 | Chung et al. | |
| 2010/0027494 A1 | 2/2010 | Kwon et al. | |
| 2010/0034164 A1* | 2/2010 | Ho et al. | 370/329 |
| 2010/0260138 A1* | 10/2010 | Liu et al. | 370/330 |
| 2010/0304776 A1 | 12/2010 | Wu et al. | |
| 2010/0309834 A1* | 12/2010 | Fischer et al. | 370/312 |
| 2011/0069629 A1 | 3/2011 | Breit et al. | |
| 2011/0075607 A1 | 3/2011 | Kim et al. | |
| 2011/0128947 A1* | 6/2011 | Liu et al. | 370/338 |
| 2011/0235533 A1 | 9/2011 | Breit et al. | |
| 2012/0250543 A1* | 10/2012 | Abraham et al. | 370/252 |
| 2012/0250618 A1* | 10/2012 | Abraham et al. | 370/328 |
| 2012/0250668 A1* | 10/2012 | Sampath et al. | 370/338 |
| 2012/0257567 A1* | 10/2012 | Abraham et al. | 370/328 |
| 2012/0257605 A1* | 10/2012 | Abraham et al. | 370/338 |
| 2012/0257606 A1* | 10/2012 | Sampath et al. | 370/338 |

FOREIGN PATENT DOCUMENTS

| | | |
|---|---|---|
| CN | 101465814 A | 6/2009 |
| EP | 1331782 A2 | 7/2003 |
| JP | 2013513309 A | 4/2013 |
| WO | 2004088897 A2 | 10/2004 |
| WO | 2008002972 A2 | 1/2008 |
| WO | 2009027931 A2 | 3/2009 |
| WO | WO-2011035204 A2 | 3/2011 |
| WO | 2011068985 A1 | 6/2011 |

OTHER PUBLICATIONS

Merlin et al. "Sounding Protocol—Segmentation and Null Feedback", doc. :IEEE 802.11-11/0041r0, https://mentor.ieee.org/802.11/dcn/11/11-11-0041-00-00ac-sounding-protocol-segmentation-and-null-feedback.pptx, Jan. 18, 2011.

IEEE P802.11ac/D0.1, Draft Standard for Information Technology—Telecommunications and information exchange between systems—Local and metropolitan area networks—Specific requirements, Jan. 2011.

International Search Report and Written Opinion—PCT/US2011/045183—ISA/EPO—Oct. 24, 2011.

Liu Y., et al., "Protocol for SU and MU Sounding Feedback (doc.:IEEE.802.11-10/1091r0)", IEEE 802.11, Sep. 14, 2010, pp. Slide 1-Slide 7, XP002660721, Retrieved from the Internet: URL:https://mentor.ieee.org/802.11/dcn/10/11-10-1091-00-00ac-protocol-for-su-and-musounding-feedback.pptx [retrieved on Oct. 6, 2011] Slide 3.

Kim et al., "GroupID Concept for Downlink MU-MIMO Transmission", Jan. 18, 2010, pp. Slide 1-Slide 8, XP002645417, Retrieved from the Internet: URL:https://mentor.ieee.org/.../I1-10-0073 -00-00ac-group-id-concept-for-dl-mu-mimo.p pt [retrieved on Jun. 28, 2011].

* cited by examiner

| 80 MHz | 8x8 | 8x4 | 8x3 | 8x2 | 8x1 |
|---|---|---|---|---|---|
| No. Tones Per Grp | | | | | |
| 1(234 tones) | 29952 | 14976 | 11232 | 7488 | 3744 |
| 2(117 tones) | 14976 | 7488 | 5616 | 3744 | 1872 |
| 3(78 tones) | 9984 | 4992 | 3744 | 2496 | 1248 |
| 4(59 tones) | 7488 | 3744 | 2808 | 1872 | 936 |

| 160 MHz | 8x8 | 8x4 | 8x3 | 8x2 | 8x1 |
|---|---|---|---|---|---|
| No. Tones Per Grp | | | | | |
| 1(468 tones) | 59904 | 29952 | 22464 | 14976 | 7488 |
| 2(234 tones) | 29952 | 14976 | 11232 | 7488 | 3744 |
| 3(156 tones) | 19968 | 9984 | 7488 | 4992 | 2496 |
| 4(117 tones) | 14976 | 7488 | 5616 | 3744 | 1872 |

US 9,337,954 B2

PROTOCOL FOR CHANNEL STATE INFORMATION FEEDBACK

CLAIM OF PRIORITY UNDER 35 U.S.C. §119

The present Application for Patent claims benefit of U.S. Provisional Patent Application Ser. No. 61/368,348, filed Jul. 28, 2010, and U.S. Provisional Patent Application Ser. No. 61/372,546, filed Aug. 11, 2010 and assigned to the assignee hereof and hereby expressly incorporated by reference herein.

BACKGROUND

1. Field

Certain aspects of the present disclosure generally relate to wireless communications and, more particularly, to a method for communicating Channel State Information (CSI) feedback.

2. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

The IEEE 802.11 WLAN standards body established specifications for transmissions based on the very high throughput (VHT) approach using a carrier frequency of 5 GHz (i.e., the IEEE 802.11ac specification), or using a carrier frequency of 60 GHz (i.e., the IEEE 802.11ad specification) targeting aggregate throughputs larger than 1 Gigabits per second. One of the enabling technologies for the VHT 5 GHz specification is a wider channel bandwidth, which bonds two 40 MHz channels for 80 MHz bandwidth therefore doubling the physical layer (PHY) data rate with negligible increase in cost compared to the IEEE 802.11n standard.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide an apparatus for communications. The apparatus generally includes a transmitter configured to transmit a first control message requesting channel state information (CSI) to be computed at each of one or more other apparatuses, and a receiver configured to receive a first CSI report message with the computed CSI transmitted in response to the first control message, wherein the transmitter is also configured to transmit one or more second control messages, wherein each of the one or more second control messages requests a CSI report message with the computed CSI from a different one of the other apparatuses, the receiver is also configured to receive one or more CSI report messages transmitted in response to the one or more second control messages, and each of the first control message and the one or more second control messages comprises a sequence number used to match each of the one or more second control messages with the first control message.

Certain aspects of the present disclosure provide a method for communications. The method generally includes transmitting a first control message requesting channel state information (CSI) to be computed at each of one or more apparatuses, receiving a first CSI report message with the computed CSI transmitted in response to the first control message, transmitting one or more second control messages, wherein each of the one or more second control messages requests a CSI report message with the computed CSI from a different one of the apparatuses, and receiving one or more CSI report messages transmitted in response to the one or more second control messages.

Certain aspects of the present disclosure provide an apparatus for communications. The apparatus generally includes means for transmitting a first control message requesting channel state information (CSI) to be computed at each of one or more other apparatuses, and means for receiving a first CSI report message with the computed CSI transmitted in response to the first control message, wherein the means for transmitting is further configured to transmit one or more second control messages, wherein each of the one or more second control messages requests a CSI report message with the computed CSI from a different one of the other apparatuses, and the means for receiving is further configured to receive one or more CSI report messages transmitted in response to the one or more second control messages.

Certain aspects of the present disclosure provide a computer-program product for communications. The computer-program product generally includes a computer-readable medium comprising instructions executable to transmit a first control message requesting channel state information (CSI) to be computed at each of one or more apparatuses, receive a first CSI report message with the computed CSI transmitted in response to the first control message, transmit one or more second control messages, wherein each of the one or more second control messages requests a CSI report message with the computed CSI from a different one of the apparatuses, and receive one or more CSI report messages transmitted in response to the one or more second control messages.

Certain aspects of the present disclosure provide an access point. The access point generally includes at least one antenna, a transmitter configured to transmit, via the at least one antenna, a first control message requesting channel state information (CSI) to be computed at each of one or more access terminals, and a receiver configured to receive, via the at least one antenna, a first CSI report message with the computed CSI transmitted in response to the first control message, wherein the transmitter is also configured to transmit, via the at least one antenna, one or more second control messages, wherein each of the one or more second control messages requests a CSI report message with the computed CSI from a different one of the access terminals, and the receiver is also configured to receive, via the at least one antenna, one or more CSI report messages transmitted in response to the one or more second control messages.

Certain aspects of the present disclosure provide an apparatus of one or more apparatuses for communications. The apparatus generally includes a receiver configured to receive a first control message requesting channel state information (CSI) to be computed at each of the one or more apparatuses, and a transmitter configured to transmit, in response to the first control message, a CSI report message with the computed CSI, if the apparatus is indicated in the first control message as the one responding first with the CSI among the one or more apparatuses, wherein the receiver is also configured to receive a second control message requesting the CSI report message with the computed CSI to be transmitted from the apparatus, if the apparatus is not indicated in the first control message as the one responding first with the CSI among the one or more apparatuses, the transmitter is also configured to transmit the CSI report message in response to the received second control message, and each of the first control message and the second control message comprises a sequence number used to match the second control message with the first control message.

Certain aspects of the present disclosure provide a method for communications. The method generally includes receiving, at an apparatus of one or more apparatuses, a first control message requesting channel state information (CSI) to be computed at each of the one or more apparatuses, transmitting, in response to the first control message, a CSI report message with the computed CSI, if the apparatus is indicated in the first control message as the one responding first with the CSI among the one or more apparatuses, receiving a second control message requesting the CSI report message with the computed CSI to be transmitted from the apparatus, if the apparatus is not indicated in the first control message as the one responding first with the CSI among the one or more apparatuses, and transmitting the CSI report message in response to the received second control message.

Certain aspects of the present disclosure provide an apparatus of one or more apparatuses for communications. The apparatus generally includes means for receiving a first control message requesting channel state information (CSI) to be computed at each of the one or more apparatuses, and means for transmitting, in response to the first control message, a CSI report message with the computed CSI, if the apparatus is indicated in the first control message as the one responding first with the CSI among the one or more apparatuses, wherein the means for receiving is further configured to receive a second control message requesting the CSI report message with the computed CSI to be transmitted from the apparatus, if the apparatus is not indicated in the first control message as the one responding first with the CSI among the one or more apparatuses, and the means for transmitting is further configured to transmit the CSI report message in response to the received second control message.

Certain aspects of the present disclosure provide a computer-program product for communications. The computer-program product generally includes a computer-readable medium comprising instructions executable to receive, at an apparatus of one or more apparatuses, a first control message requesting channel state information (CSI) to be computed at each of the one or more apparatuses, transmit, in response to the first control message, a CSI report message with the computed CSI, if the apparatus is indicated in the first control message as the one responding first with the CSI among the one or more apparatuses, receive a second control message requesting the CSI report message with the computed CSI to be transmitted from the apparatus, if the apparatus is not indicated in the first control message as the one responding first with the CSI among the one or more apparatuses, and transmit the CSI report message in response to the received second control message.

Certain aspects of the present disclosure provide an access terminal of one or more access terminals. The access terminal generally includes at least one antenna, a receiver configured to receive, via the at least one antenna, a first control message requesting channel state information (CSI) to be computed at each of the one or more access terminals, and a transmitter configured to transmit, via the at least one antenna in response to the first control message, a CSI report message with the computed CSI, if the access terminal is indicated in the first control message as the one responding first with the CSI among the one or more access terminals, wherein the receiver is also configured to receive, via the at least one antenna, a second control message requesting the CSI report message with the computed CSI to be transmitted from the access terminal, if the access terminal is not indicated in the first control message as the one responding first with the CSI among the one or more access terminals, and the transmitter is also configured to transmit, via the at least one antenna, the CSI report message in response to the received second control message.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
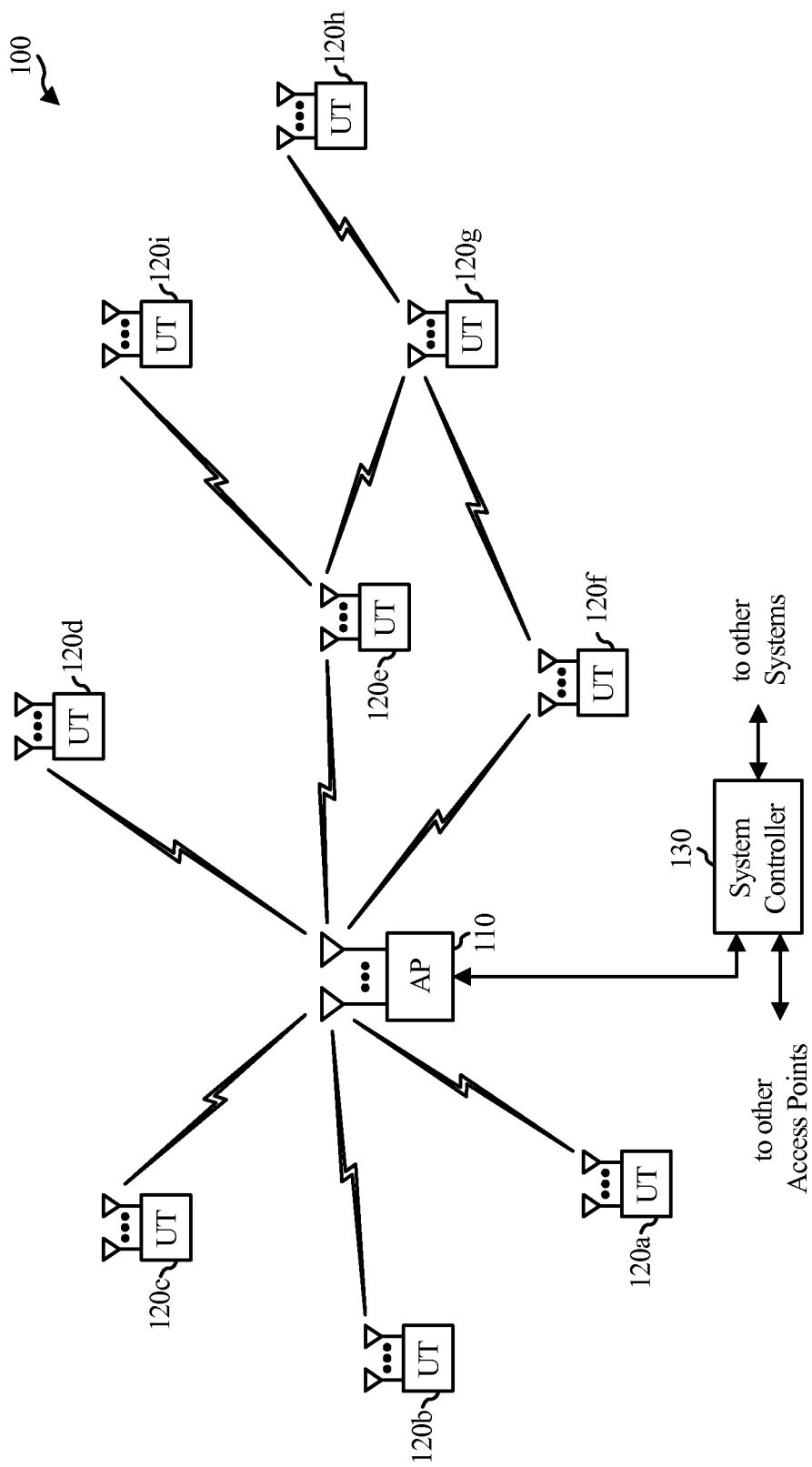
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or some other standards known in the art.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium. According to certain aspects of the present disclosure, the access point may operate in accordance with the Institute of Electrical and Electronics Engineers (IEEE) 802.11 family of wireless communications standards.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. According to certain aspects of the present disclosure, the access terminal may operate in accordance with the IEEE 802.11 family of wireless communications standards.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

The wireless system 100 illustrated in FIG. 1 may operate in accordance with IEEE 802.11ac wireless communications standard. The IEEE 802.11ac represents a new IEEE 802.11 amendment that allows for higher throughput in IEEE 802.11 wireless networks. The higher throughput may be realized through several measures such as parallel transmissions to multiple stations 120 at once, or by using a wider channel bandwidth (e.g., 80 MHz or 160 MHz). The IEEE 802.11ac is also referred to as Very High Throughput (VHT) wireless communications standard.

Figure 2:
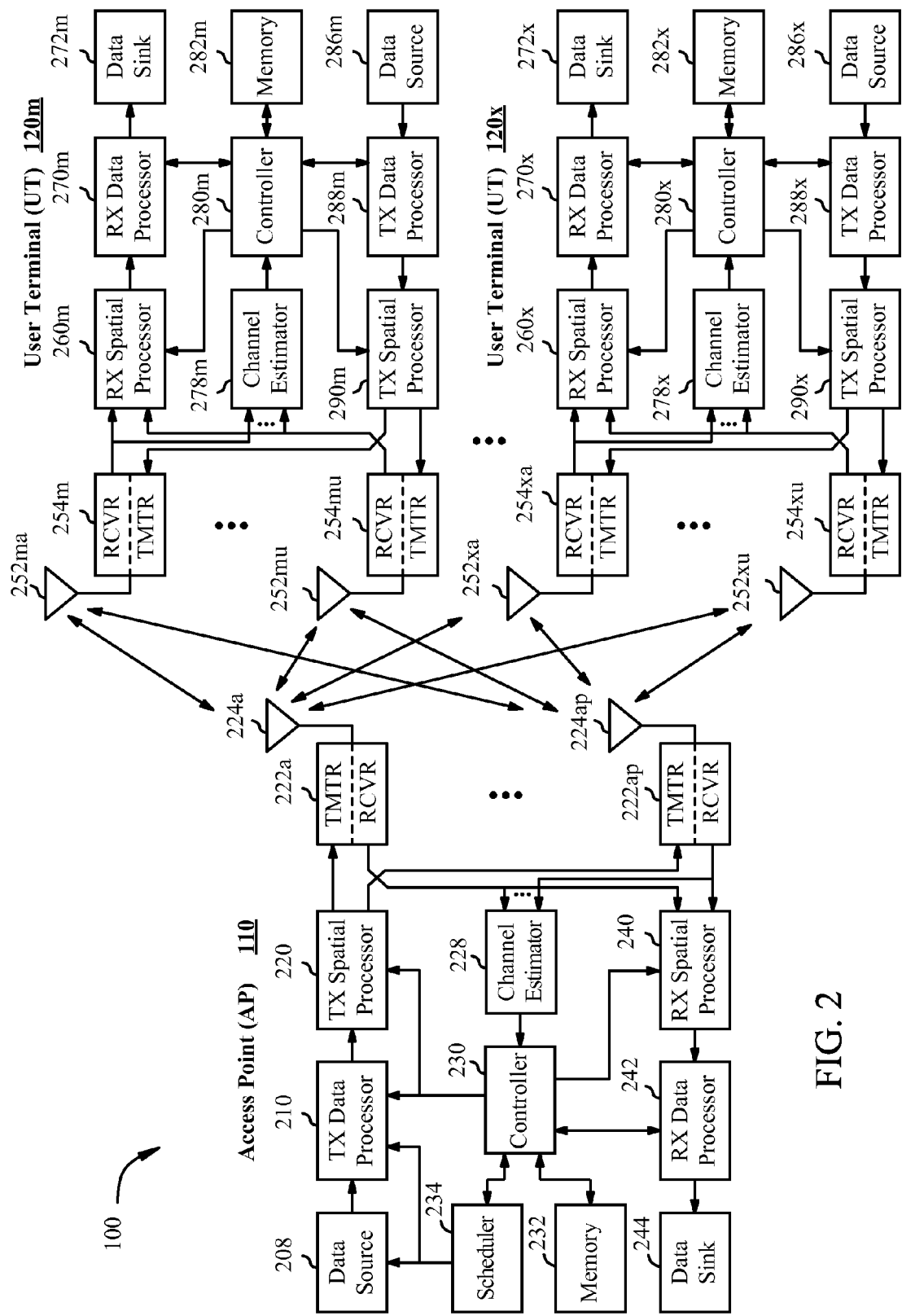
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the modulation and coding schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

In an aspect of the present disclosure, one or more Channel State Information (CSI) request messages may be transmitted from the access point 110 to one or more of the user terminals 120, wherein requested CSI reports may be related to channels of the user terminals 120. The CSI request messages may comprise broadcast and/or unicast messages. In response to the one or more CSI request messages received at a user terminal 120, a CSI feedback report may be transmitted from that user terminal 120 back to the access point 110. Certain aspects of the present disclosure support low-overhead frame formats for the CSI request messages and CSI feedback report messages.

Figure 3:
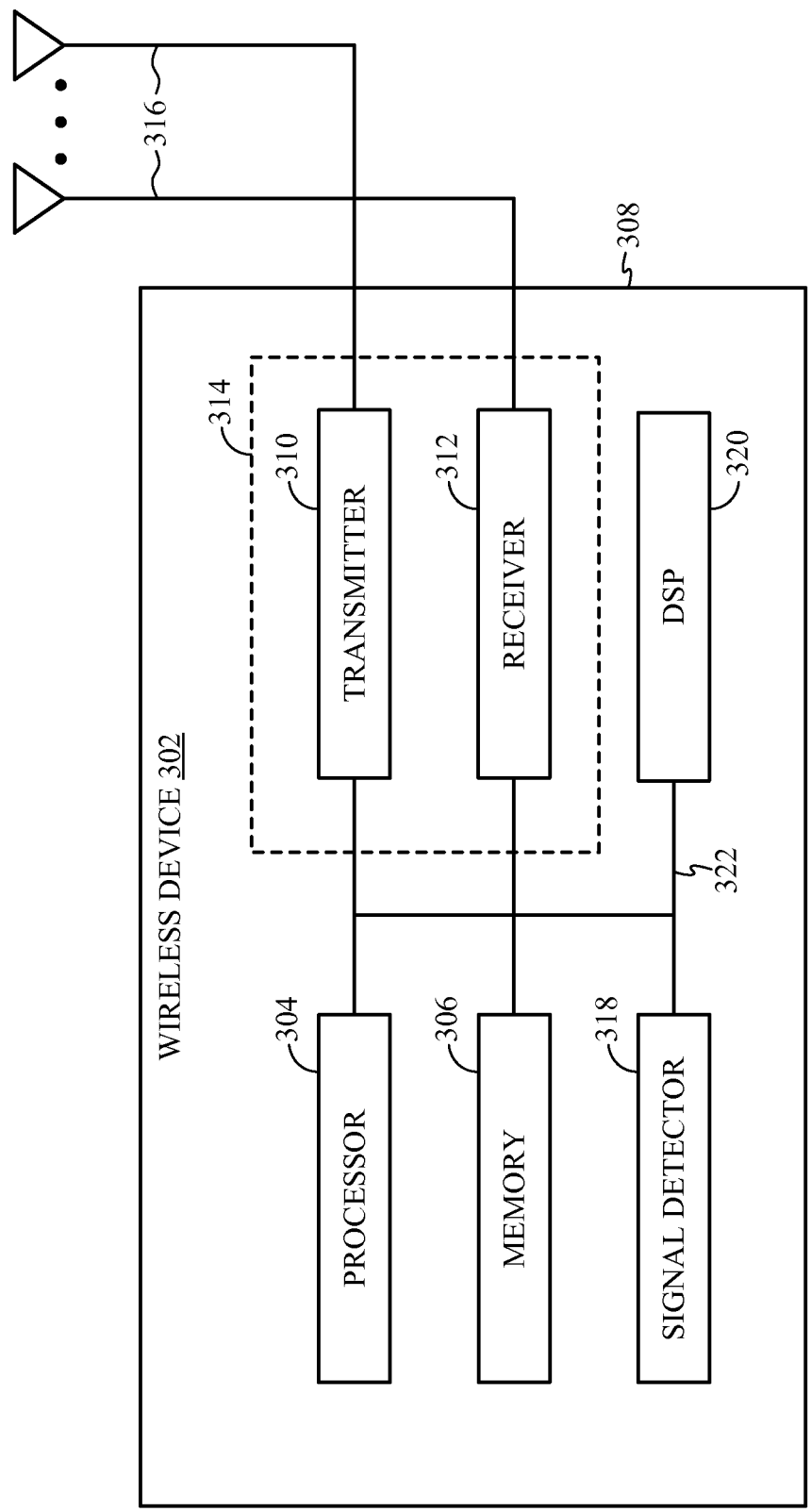
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

In an aspect of the present disclosure, one or more CSI request messages may be transmitted from the wireless device 302 to one or more user terminals (not shown in FIG. 3). In another aspect, one or more CSI request messages may be transmitted from an access point (not shown in FIG. 3) to the wireless device 302, wherein the wireless device may be one of user terminals served by the access point. The CSI request messages may comprise broadcast and/or unicast messages. In response to the one or more CSI request messages received at the wireless device 302, a CSI feedback report may be transmitted from the wireless device 302 to the serving access point. Low-overhead frame formats for the CSI request messages and CSI feedback report messages are proposed in this disclosure.

The various components of the wireless device 302 may be coupled together by a bus system 322, which may include a power bus, a control signal bus, and a status signal bus in addition to a data bus.

Protocol For Communicating Channel State
Information Feedback Report

Certain aspects of the present disclosure support low-overhead methods for communicating CSI feedback reports from user stations (STAs) 120 to an access point (AP) 110 of the wireless system 100 illustrated in FIGS. 1-2. The present disclosure also proposes packet formats for Null Data Packet Announcement (NDPA) message, CSI Poll message and CSI feedback message. In certain cases, the CSI feedback may be too large to be carried in a single Media access control Protocol Data Unit (MPDU) or in a Physical layer convergence procedure Protocol Data Unit (PPDU). In these cases, a protocol for CSI feedback segmentation may be employed in accordance with certain aspects of the present disclosure.

Figure 4:
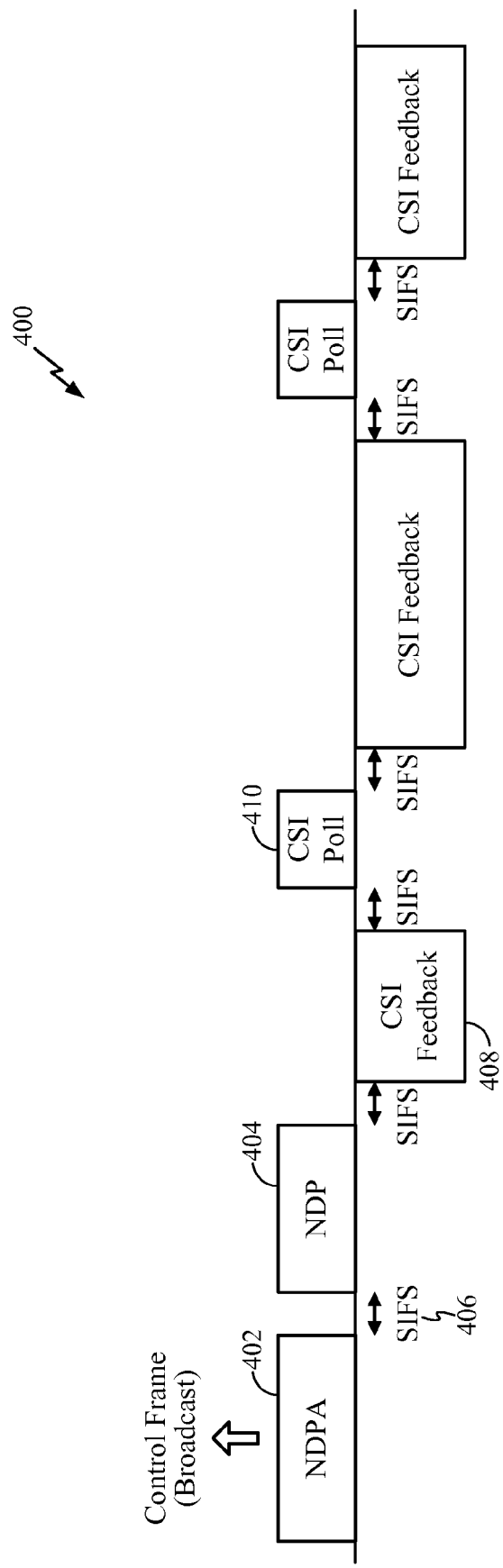
FIG. 4 illustrates an example of Channel State Information (CSI) feedback protocol in accordance with certain aspects of the present disclosure.

FIG. 4 illustrates an example of CSI feedback protocol 400 in accordance with certain aspects of the present disclosure. An AP may transmit to a plurality of user STAs an NDPA frame 402 followed by a Null Data Packet (NDP) frame 404 after a Short Inter-Frame Symbol (SIFS) period 406. The NDPA frame 402 may comprise Association Identifiers (AIDs) of the STAs that are expected to transmit computed CSI feedback messages to the AP.

Those STAs that are not listed in the NDPA may ignore the following NDP frame 404. In an aspect, the NDP frame 404 may comprise a sounding frame utilized by each of the STAs to compute a corresponding CSI feedback associated with that STA. A first listed STA within the NDPA frame 402 may transmit a CSI feedback 408 a SIFS period after the transmission of NDP frame 404, as illustrated in FIG. 4. Other STA Identifiers (IDs) may be polled by utilizing a CSI Poll message (e.g., a CSI Poll 410) for each STA.

Figure 5:
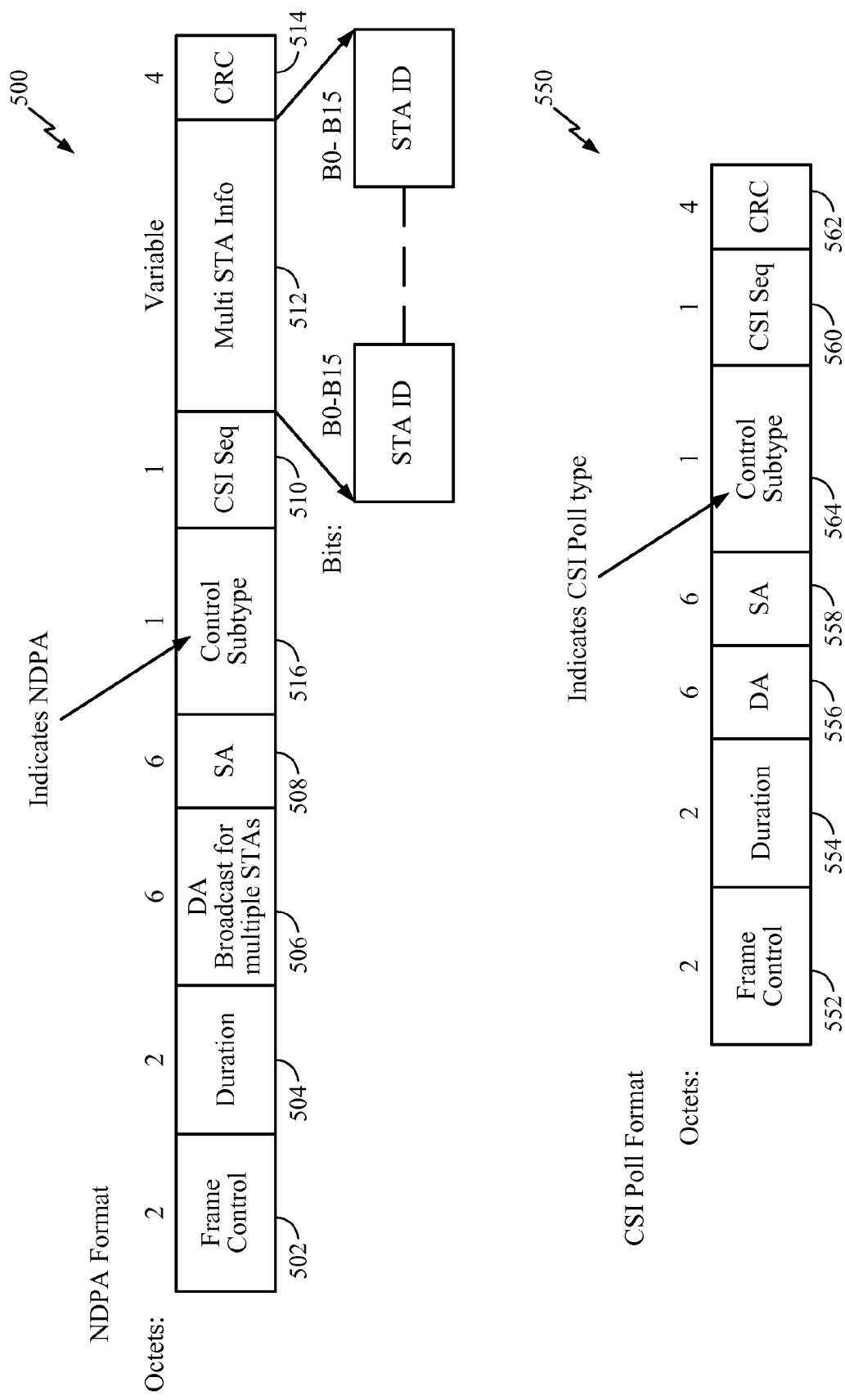
FIG. 5 illustrates example formats of CSI request messages in accordance with certain aspects of the present disclosure.

FIG. 5 illustrates example formats of CSI request messages 500 and 550 in accordance with certain aspects of the present disclosure. The CSI request message 500 may be of type control frame and may comprise an NDPA message (i.e., a broadcast control message). The CSI request message 550 may be also of type control frame and may comprise a CSI Poll message (i.e., a unicast control message). For certain aspects of the present disclosure, the CSI request message 500 and the CSI request message 550 may comprise the same unified structure.

In an aspect, the CSI request message 500 may comprise at least one of: a frame control field 502, a duration field 504, a destination address (DA) field 506, a source address (SA) field 508, a CSI Sequence field 510, a Multi STA information field 512, a Cyclic Redundancy Check (CRC) field 514, or a control subtype field 516. In an aspect, the frame control field 502 may indicate using extended subtypes that the CSI request message 500 may correspond to the NDP announcement. The DA field 506 may be set to broadcast/multicast ID for multiple destination STAs. The CSI sequence field 510 may be used to match a CSI Poll to a corresponding NDPA. The Multi STA information field 512 may comprise an association ID of each STA requested to compute CSI feedback. In an aspect, the control subtype field 516 may be utilized to indicate that the CSI request message 500 represents an NDPA message.

In an aspect, the CSI request message 550 may correspond to a CSI Poll dedicated to one of the destination STAs and may comprise at least one of: a frame control field 552, a duration field 554, a DA field 556, an SA field 558, a CSI Sequence field 560, a CRC field 562, or a control subtype field 564. In an aspect, the frame control field 552 may indicate using extended subtypes that the CSI request message 550 may correspond to the CSI Poll. The DA field 556 may be set to an address of STA intended to be polled by the CSI request message 550. The CSI sequence value 560 may be utilized for matching the CSI Poll 550 to a corresponding NDPA (i.e., the NDPA message 500). In an aspect, the control subtype field 564 may indicate a CSI poll type.

Figure 6:
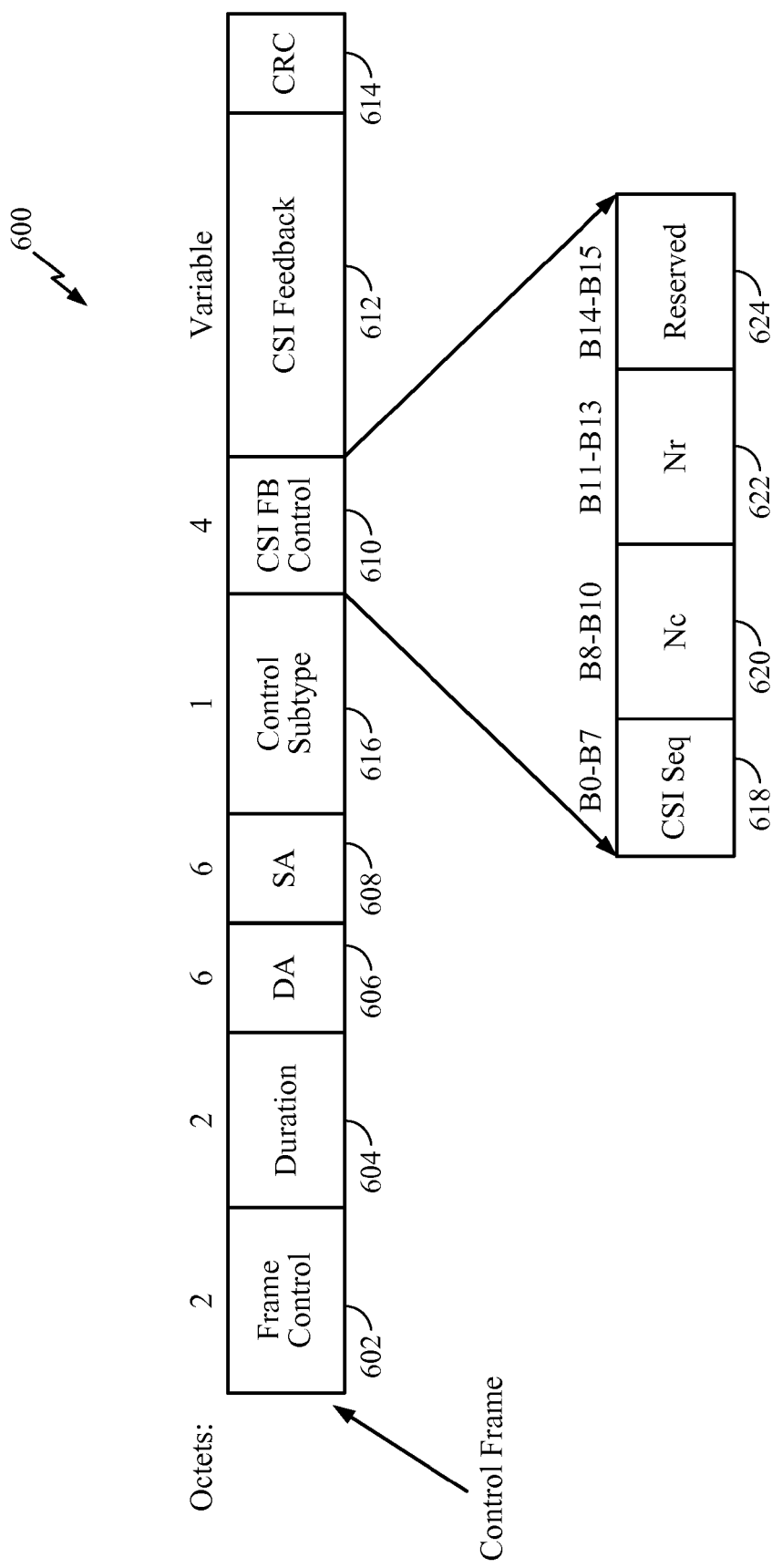
FIG. 6 illustrates an example format of CSI report message in accordance with certain aspects of the present disclosure.

FIG. 6 illustrates an example format of a CSI report message 600 comprising a CSI feedback in accordance with certain aspects of the present disclosure. The CSI report message 600 may comprise at least one of: a frame control field 602, a duration field 604, a DA field 606, an SA field 608, a CSI feedback control field 610, a CSI feedback field 612 with the computed CSI, a CRC field 614, or a control subtype field 616. The CSI report message may be of type control. In an aspect, the control subtype field 616 may indicate that the message 600 represents the CSI report message with CSI feedback. As illustrated in FIG. 6, the CSI feedback control field 610 may comprise at least one of: a CSI sequence sub-field 618 that may be set to a CSI sequence number of a corresponding NDPA/CSI Poll, a sub-field 620 with a number of columns of CSI feedback matrix, a sub-field 622 with a number of rows of CSI feedback matrix, or a field 624 with reserved bits.

Segmentation/Reassembly For Channel State Information

In certain cases, a number of bytes of CSI feedback may be too large for transmitting the entire CSI feedback at once. For example, in the case of 8×4 160 MHz compressed bandwidth, the number of bytes for the CSI feedback may be approximately equal to 15K. A large CSI feedback may not be able to fit into one MAC Protocol Data Unit (MPDU) due to MPDU size limitations. The size of MPDU may be limited by an Aggregated MAC Protocol Data Unit (A-MPDU) delimiter and/or STA capabilities.

Certain aspects of the present disclosure support additional capabilities that may be required to accommodate a large CSI feedback. For example, the CSI feedback may be segmented into multiple MPDUs, as the IEEE 802.11n specification supports CSI feedback segmentation. The present disclosure proposes transmitting segments of the CSI feedback within multiple MPDUs of an A-MPDU.

Figure 7:
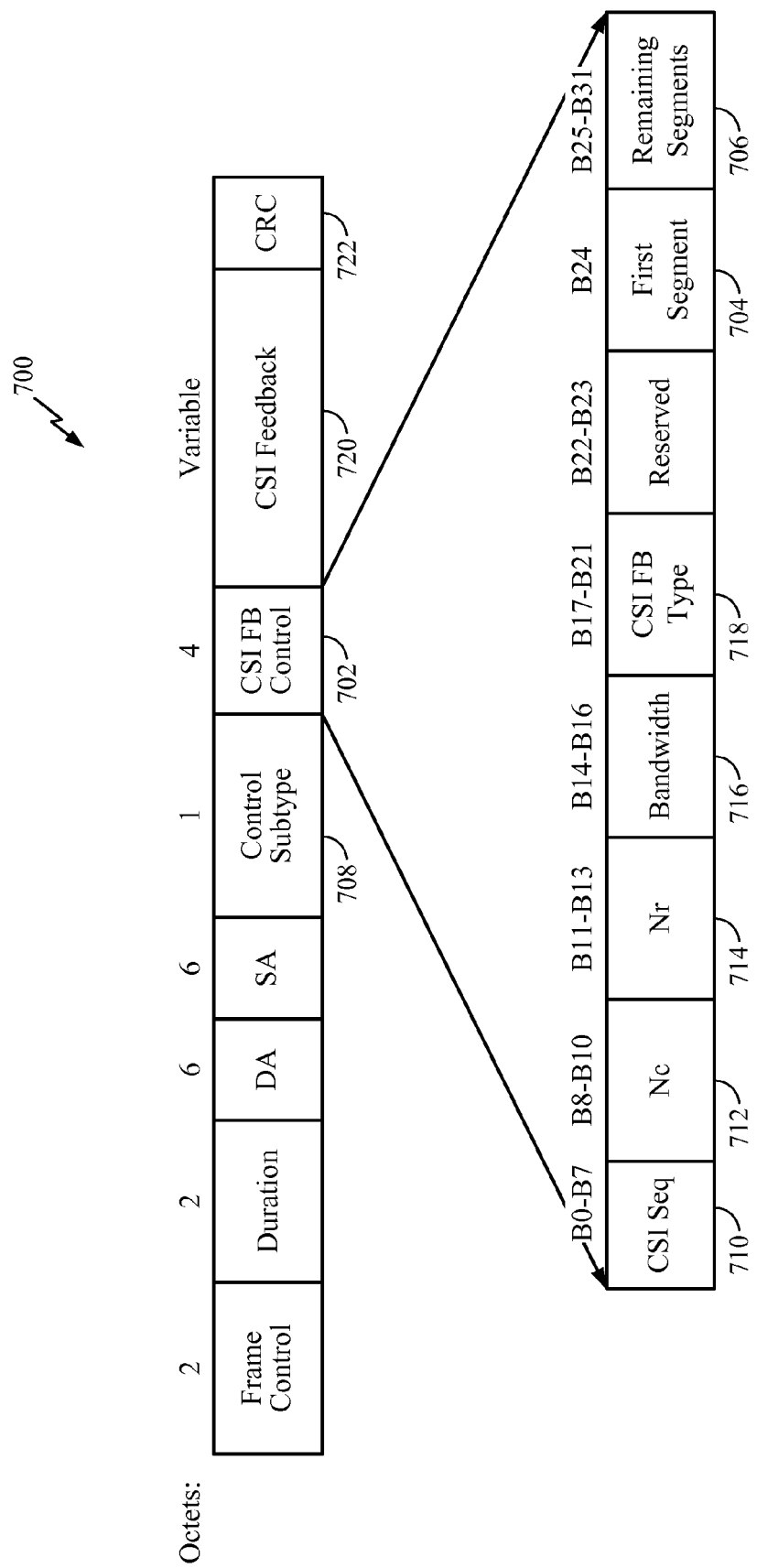
FIG. 7 illustrates an example format of CSI feedback with segmentation in accordance with certain aspects of the present disclosure.

FIG. 7 illustrates an example format of a CSI report message 700 with segmentation in accordance with certain aspects of the present disclosure. The CSI report message 700 may be of type control frame. As illustrated in FIG. 7, a CSI feedback control field 702 of the CSI report message 700 may be extended by one byte for segmentation control. A first segment sub-field 704 (e.g., one bit) may indicate if a corresponding MPDU represents the first segment of CSI feedback. A "Remaining Segments" sub-field 706 (e.g., comprising seven bits) may indicate a number of segments of the CSI feedback that remains to be transmitted after the current MPDU. In an aspect, a control subtype field 708 may be included within the CSI report message 700, as illustrated in FIG. 7. In this case, the control subtype field 708 may indicate that the message 700 represents the CSI report message with a segment of the CSI feedback.

For certain aspects of the present disclosure, specific frames may be required to be transmitted in response to a CSI Poll, if a corresponding NDPA has not been received at a particular STA being requested by the CSI Poll to transmit CSI associated with that STA. In one aspect of the present disclosure, the STA may transmit a normal Acknowledgement (ACK) frame acknowledging successful reception of the CSI Poll. In another aspect of the present disclosure, the STA may transmit a CSI Null frame acknowledging successful reception of CSI Poll in case the corresponding NDPA has not been received.

The CSI report message 700 illustrated in FIG. 7 may also represent the CSI Null frame. In this case, a CSI sequence sub-field 710 of the CSI feedback control field 702 may be set to a sequence number of the received CSI Poll, sub-fields 712 and 714 respectively indicating number of columns and rows of CSI feedback matrix may be both set to zero, a bandwidth sub-field 716 may comprise any value, a CSI feedback type sub-field 718 may be set to a default value, the first segment sub-field 704 may comprise a value of one, and a value of the "Remaining Segments" sub-field 706 may be set to zero. A variable CSI feedback portion 720 of the CSI Null frame 700 may not be transmitted, i.e., the STA's CSI may not be transmitted within the CSI Null frame 700.

In one aspect of the present disclosure, the CSI feedback type sub-field 718 of the regular CSI report message 700 may comprise at least one of: information about a method used for computing the CSI feedback 720, information about a method used for compressing the CSI feedback 720, information about a type of the STA transmitting the CSI report message 700 and about a demodulation technology applied at this STA, or information about a level of fidelity of a CRC sum stored in a CRC field 722 of the CSI report message 700.

According to certain aspect of the present disclosure, an A-MPDU may be allowed to comprise multiple MPDUs, if each of the MPDUs does not require an acknowledgment to confirm its successful reception at an AP. The use of "End of Frame (EOF)" bit within such A-MPDU may be identical to the case with Quality of Service (QoS) data, i.e., the "EOF" bit may be set on a delimiter following the last MPDU. The AP may re-poll for CSI feedback, if the AP detects that any of the segments are missing.

A large CSI feedback may also span several Physical layer convergence procedure Protocol Data Units (PPDUs). However, the size of PPDU may be limited at AP/STA. In addition, transmission time of a single PPDU may be large due to a utilized Modulation-Coding Scheme (MCS).

A CSI Poll for next STA may be transmitted from an AP a SIFS time period after receiving a previous CSI feedback. The STAs may be limited to transmitting exactly one PPDU. Therefore, multiple PPDUs may require the capability to poll for separate segments of CSI feedback.

Figure 8:
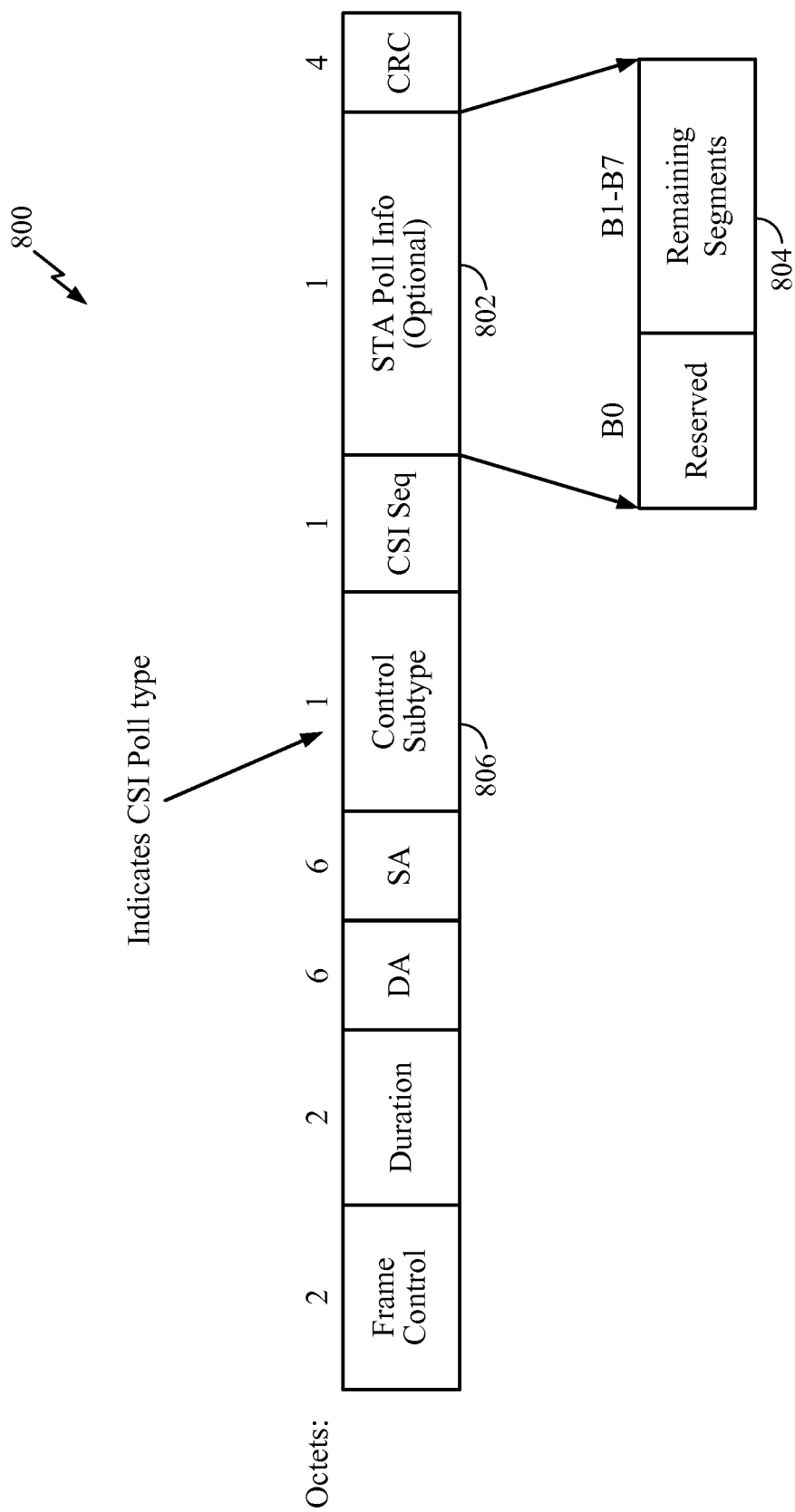
FIG. 8 illustrates an example CSI Poll message with segment indication in accordance with certain aspects of the present disclosure.

Certain aspects of the present disclosure support including an indication about remaining segments of CSI feedback into a STA Poll Information field 802 of a CSI Poll 800, as illustrated in FIG. 8. If the STA Poll Information field is absent from the CSI Poll, a STA may always transmit CSI starting from a first segment of one or more segments of CSI feedback. If the STA Poll Information field is present, a STA may transmit a CSI feedback based on Remaining Segments indication 804 of the CSI Poll 800. In an aspect, a control subtype field 806 may be included within the CSI Poll 800. Similarly as for the CSI Poll 550 illustrated in FIG. 5, the one-byte control subtype field 806 may indicate that the transmitted CSI request message 800 represents the CSI Poll with the segment indication.

Figure 9:
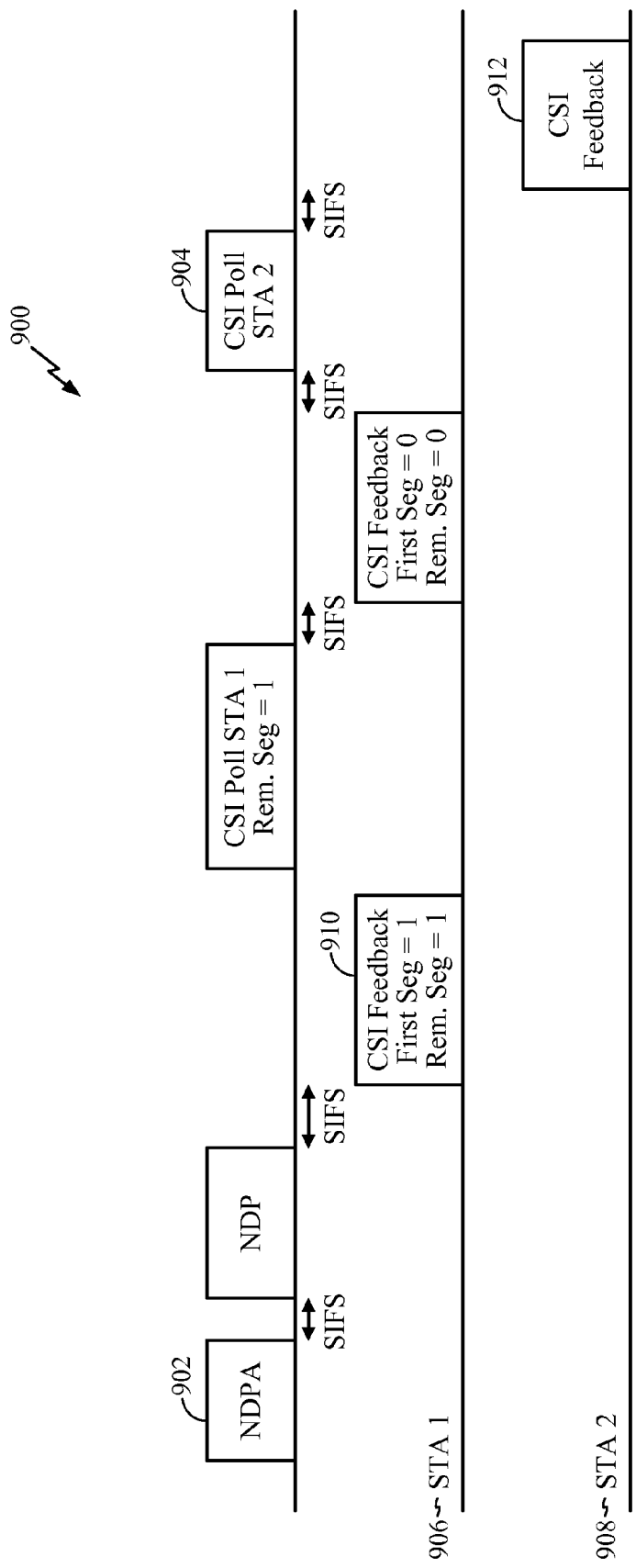
FIG. 9 illustrates an example protocol for transmitting CSI feedback in multiple Physical layer convergence procedure Protocol Data Units (PPDUs) in accordance with certain aspects of the present disclosure.

FIG. 9 illustrates an example protocol 900 for transmitting CSI feedback in multiple PPDUs in accordance with certain aspects of the present disclosure. It can be observed that if a CSI request message (e.g., a message 902 or a message 904) carries no "Remaining Segments" indication, then a STA (e.g., a STA 906 or a STA 908) may be transmitting a CSI feedback (e.g., a CSI feedback 910 or a CSI feedback 912) starting from a first segment of that CSI feedback. In an aspect, an AP sending the CSI request may be able to determine if any segments are missing from a combination of the first segment bit and received "Remaining Segments" indications. The AP may request missing/remaining segments by using a CSI Poll with a remaining segment indication.

Figure 10:
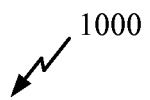
FIG. 10 illustrates examples of a CSI feedback size in accordance with certain aspects of the present disclosure.

FIG. 10 illustrates examples 1000 of a CSI feedback size in accordance with certain aspects of the present disclosure. The illustrated tables 1000 provide an approximate number of bytes in CSI feedback for various channel bandwidths and various antenna configurations. For example, 16 bits may be used for each tone for each channel element in order to account for compression. Tone grouping may be also applied, e.g., tone groups of two, three and four tones may be considered (only one tone of CSI feedback per group).

Figure 11:
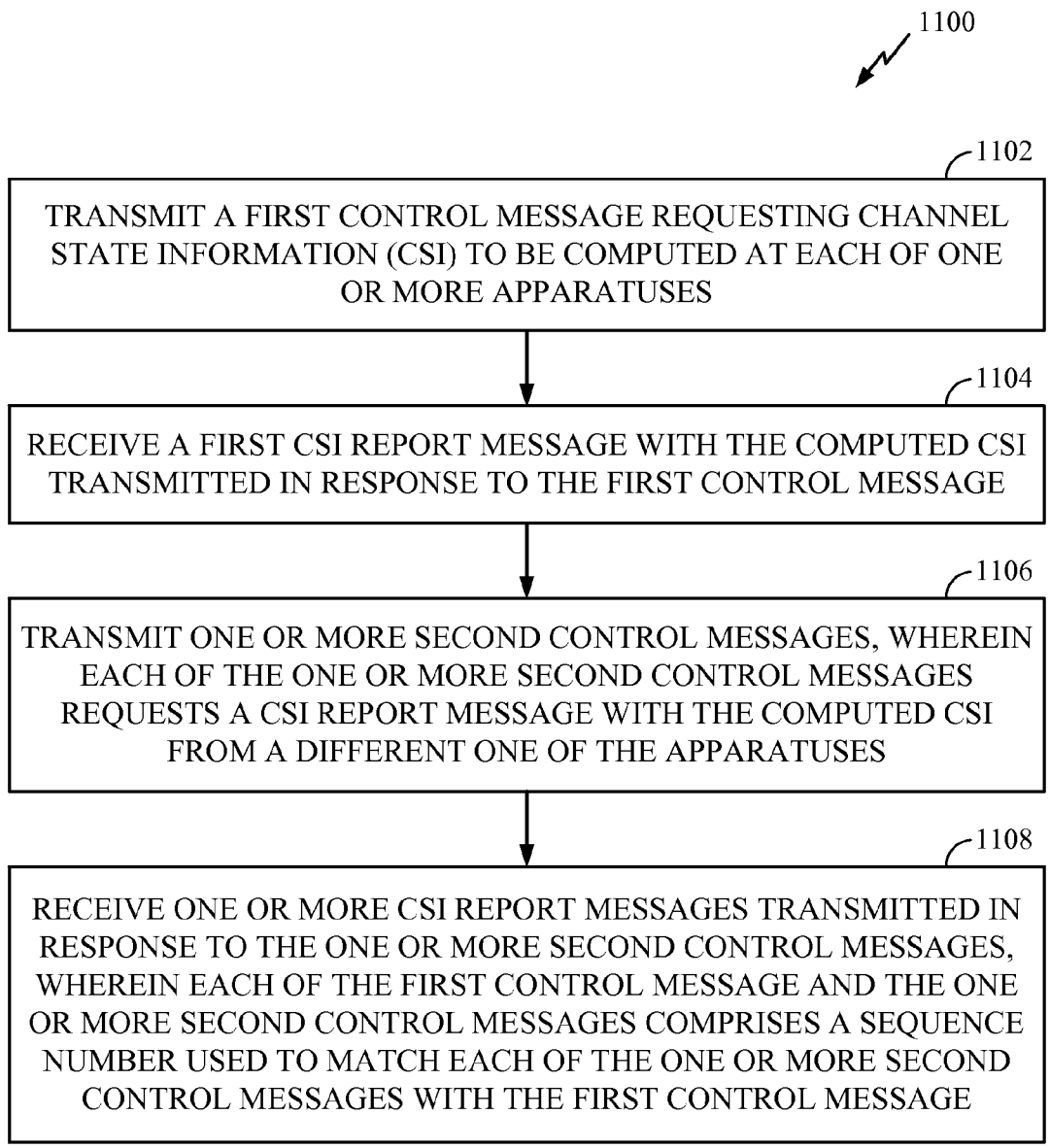
FIG. 11 illustrates example operations that may be performed at an access point in accordance with certain aspects of the present disclosure.

FIG. 11 illustrates example operations 1100 that may be performed at an access point in accordance with certain aspects of the present disclosure. At 1102, the access point may transmit a first control message requesting CSI to be computed at each of one or more apparatuses (i.e., user STAs). At 1104, the access point may receive a first CSI report message with the computed CSI transmitted in response to the first control message. At 1106, the access point may transmit one or more second control messages, wherein each of the one or more second control messages may request a CSI report message with the computed CSI from a different one of the apparatuses. At 1108, the access point may receive one or more CSI report messages transmitted in response to the one or more second control messages, wherein each of the first control message and the one or more second control messages comprises a sequence number (i.e., a CSI sequence field) used to match each of the one or more second control messages with the first control message.

In an aspect, each of the second control messages may be transmitted in a different time period. Further, each of the one or more CSI report messages may be received immediately after transmitting one of the second control messages requesting that CSI report message and before transmitting any other of the second control messages.

In one aspect of the present disclosure, a Network Allocation Vector (NAV) within the first control message may indicate a time required for transmitting at least one of the first control message or the one or more second control messages. During this indicated time a medium may be reserved for transmitting the at least one of first control message or one or more second control messages.

The first control message may comprise an indication that the CSIs computed by all the apparatuses are expected to be communicated simultaneously as an uplink Multi-User Multiple-Input Multiple-Output (MU-MIMO) Spatial Division Multiple Access (SDMA) transmission. Alternatively, the first control message may comprise an indication that the CSIs computed by the apparatuses are expected to be communicated sequentially. In one aspect, a duration field of the first control message may indicate duration of the MU-MIMO transmission. In another aspect, a STA information field of the first control message may indicate duration of the MU-MIMO transmission.

In an aspect, the first control message and the one or more second control messages may be transmitted in accordance with the family of IEEE 802.11 wireless communications standards. The transmission of first control message may comprise broadcasting the first control message to the apparatuses, and the transmission of one or more second control messages may be a unicast transmission to each one of the apparatuses.

In an aspect, each of the first control message and the one or more second control messages may comprise a control frame of IEEE 802.11 wireless communications standards. Further, each of the first CSI report message and the one or more CSI report messages may comprise a control frame of IEEE 802.11 wireless communications standards.

In another aspect, each of the first control message and the one or more second control messages may comprise an Action No Acknowledgement frame of IEEE 802.11 wireless communications standards. Further, each of the first CSI report message and the one or more CSI report messages may comprise an Action No Acknowledgement frame of IEEE 802.11 wireless communications standards.

In an aspect of the present disclosure, a STA information field of the first control message may comprise information about Modulation-Coding Schemes (MCSs) used by the other apparatuses for transmissions of the first CSI report message and the one or more CSI report messages. Further, an Acknowledgement (ACK) field within one of the second control messages may acknowledge to one of the other apparatuses successful reception of a most recently transmitted CSI computed at that other apparatus, wherein the ACK field may comprise a sequence number of the most recently transmitted CSI. Also, a control subtype field within one of the second control messages dedicated to one of the other apparatuses may indicate that that one second control message represents one CSI poll from a set of CSI poll messages, and each CSI poll from the set may request a different segment of the CSI computed at that other apparatus.

Figure 12:
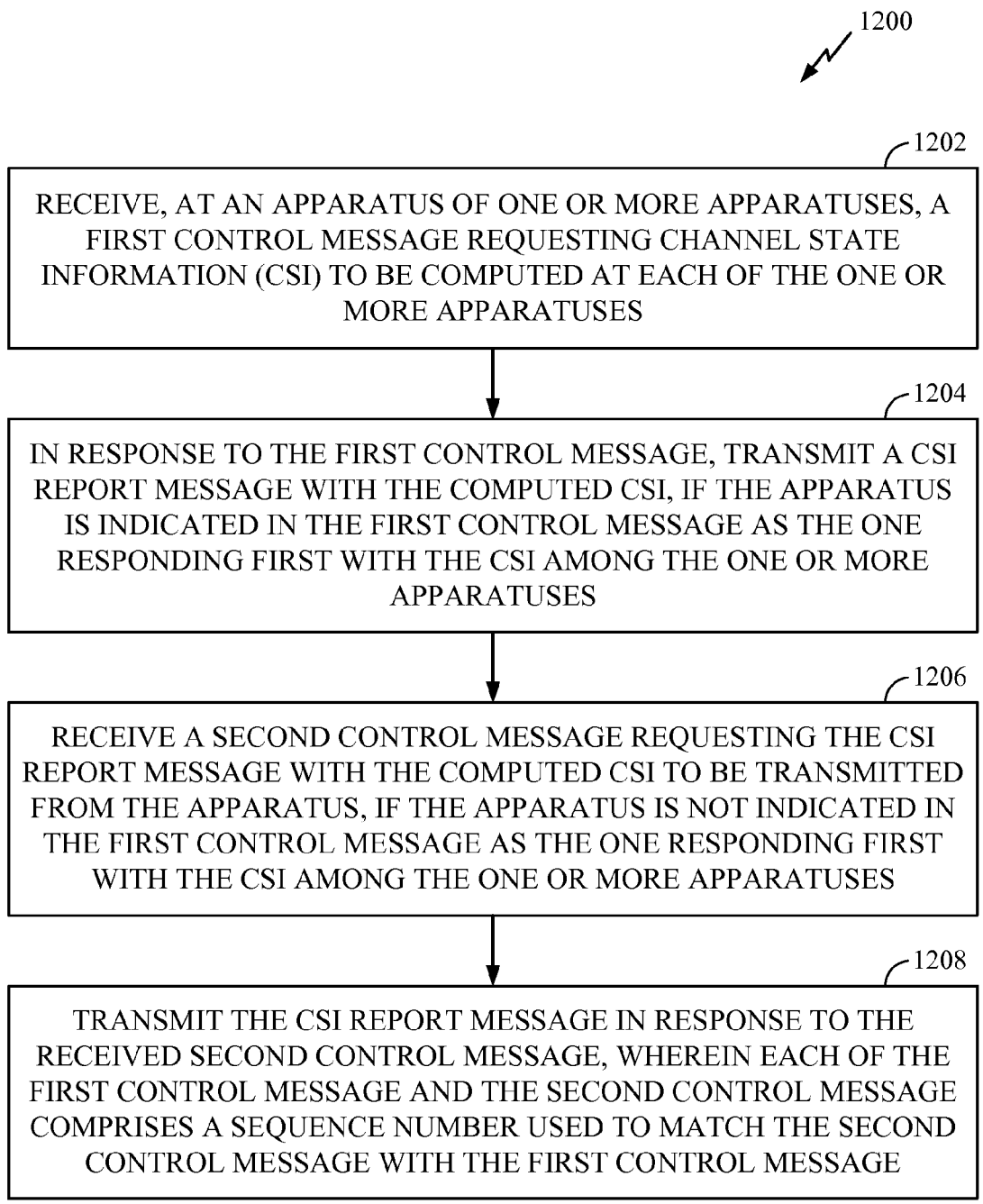
FIG. 12 illustrates example operations that may be performed at a user station in accordance with certain aspects of the present disclosure.

FIG. 12 illustrates example operations 1200 that may be performed at a user STA of one or more STAs in accordance with certain aspects of the present disclosure. At 1202, the STA may receive, e.g., from an access point, a first control message requesting CSI to be computed at each of the one or more STAs. In response to the first control message, the STA may transmit, at 1204, a CSI report message with the computed CSI, if the STA is indicated in the first control message as the one responding first with the CSI among the one or more apparatuses. At 1206, the STA may receive, e.g., from the access point, a second control message requesting the CSI report message with the computed CSI to be transmitted from the STA, if the STA is not indicated in the first control message as the one responding first with the CSI among the one or more STAs. At 1208, the STA may transmit the CSI report message in response to the received second control message, wherein each of the first control message and the second control message may comprise a sequence number used to match the second control message with the first control message.

In an aspect of the present disclosure, the STA may receive a control message requesting other CSI to be transmitted from the STA. Then, the STA may transmit a CSI Null frame acknowledging reception of the control message, if another control message requesting the other CSI to be computed at each of the one or more STAs was not received at the STA. The CSI Null frame may comprise at least one of: a CSI sequence number set to a sequence number of the received control message, an indication that the other CSI is not transmitted within the CSI Null frame, a CSI feedback type field set to a default value, or an indication that a number of segments in which the CSI Null frame is transmitted is equal to one.

To summarize, the present disclosure proposes a frame format for CSI feedback communications. Group Identifier (Group ID) management may be separated from the CSI protocol, i.e., only STA AIDs may be indicated in an NDPA message. In an aspect, there may be no indication about a number of STAs in the NDPA, and this information may be inferred from the length of NDPA.

Further, no field may be specified for a "first responder" STA. The first listed STA-AID in the NDPA may implicitly represent the first responder. In an aspect, a single control frame format may be utilized for both NDPA and CSI Poll. NDPA and CSI Poll may carry a sequence number to enable STAs to match the CSI Poll to the corresponding NDPA. One or more bits within a STA Information field of a broadcast control message (i.e., of the NDPA message) may comprise a CSI sequence number and may be used to acknowledge a most recently (previously) received CSI feedback, as well as to accommodate rate adaptation for CSI feedback transmissions. In one aspect, the CSI sequence number may comprise a dialog token as the one used in IEEE 802.11 action frames. In another aspect, the CSI sequence number may comprise a time stamp derived from a timing synchronization function.

Figure 11A:
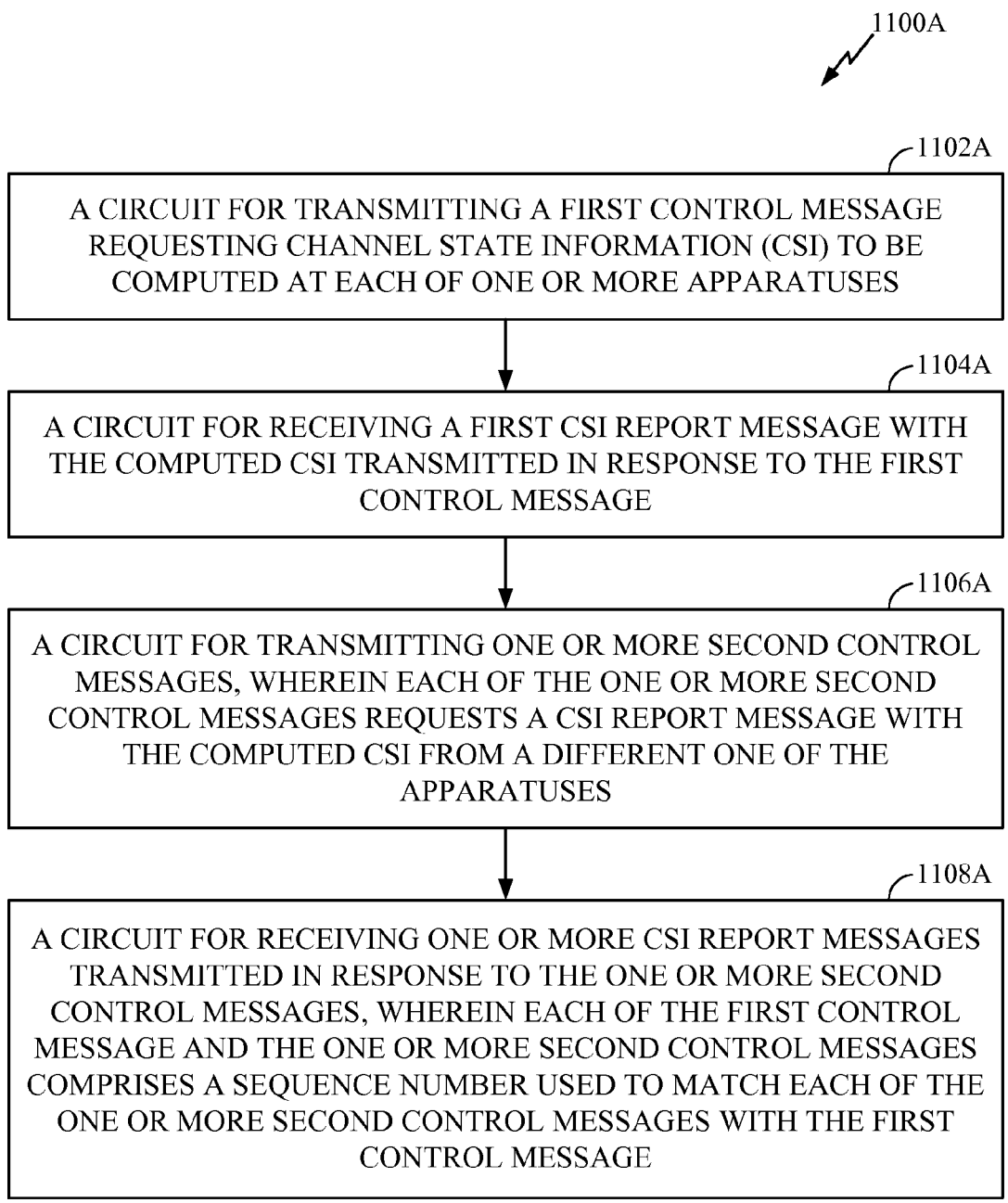
FIG. 11A illustrates example components capable of performing the operations shown in FIG. 11.
Figure 12A:
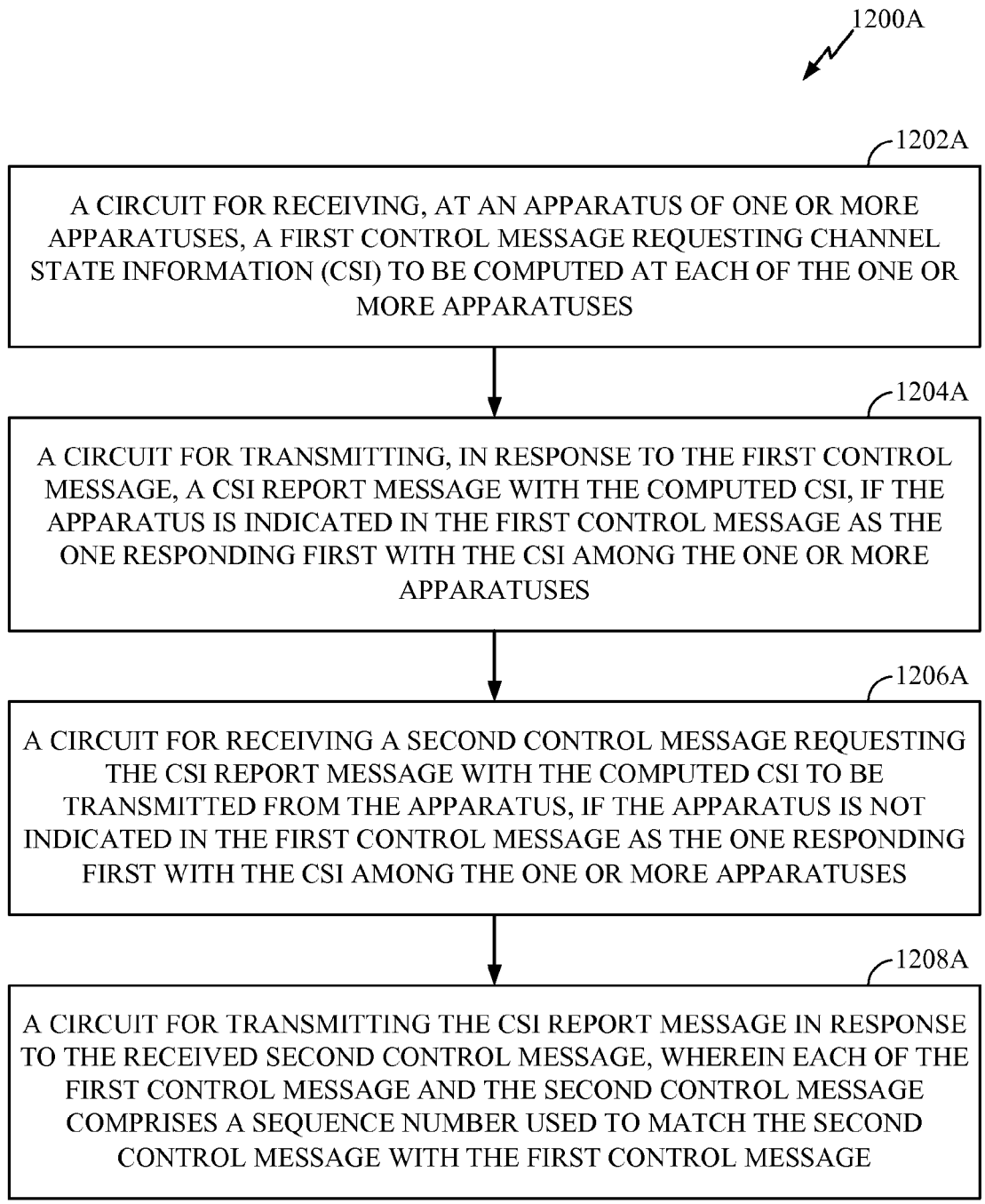
FIG. 12A illustrates example components capable of performing the operations shown in FIG. 12.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering. For example, operations 1100 and 1200 illustrated in FIGS. 11 and 12 correspond to components 1100A and 1200A illustrated in FIGS. 11A and 12A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for transmitting may comprise a transmitter, e.g., the transmitter 222 from FIG. 2 of the access point 110, the transmitter 254 from FIG. 2 of the user terminal 120, or the transmitter 310 from FIG. 3 of the wireless device 302. The means for receiving may comprise a receiver, e.g., the receiver 222 from FIG. 2 of the access point 110, the receiver 254 from FIG. 2 of the user terminal 120, or the receiver 312 from FIG. 3 of the wireless device 302. The means for computing may comprise an application specific integrated circuit, e.g., the processor 270 from FIG. 2 of the user terminal 120, or the processor 304 from FIG. 3 of the wireless device 302.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An apparatus for communications, comprising:
   a transmitter configured to transmit a first control message prior to transmitting a sounding frame, the first control message requesting channel state information (CSI) to be computed, based on the sounding frame, at each of a plurality of other apparatuses; and
   a receiver configured to receive a first CSI report message transmitted in response to the first control message from at least one of the other apparatuses, wherein the first CSI report message comprises at least a segment of the computed CSI and at least an indication about a number of remaining segments of the computed CSI to be transmitted, and wherein:
   the transmitter is also configured to transmit one or more second control messages, wherein each of the one or more second control messages requests a CSI report message with the computed CSI from a different one of the other apparatuses, and wherein each of the first control message and the one or more second control messages comprises a sequence number used to match each of the one or more second control messages with the first control message, and
   the receiver is also configured to receive one or more CSI report messages transmitted in response to the one or more second control messages.

2. The apparatus of claim 1, wherein the sequence number comprises at least one of a dialog token as the one used in IEEE 802.11 action frames, or a time stamp derived from a timing synchronization function.

3. The apparatus of claim 1, wherein:
   each of the second control messages is transmitted in a different time period, and
   each of the one or more CSI report messages is received immediately after transmitting one of the second control messages requesting that CSI report message and before transmitting any other of the second control messages.

4. The apparatus of claim 1, wherein:
   the transmitter is also configured to transmit the sounding frame immediately following transmission of the first control message.

5. The apparatus of claim 1, wherein a station (STA) information field within the first control message comprises a STA identifier (ID) associated with each of the other apparatuses.

6. The apparatus of claim 1, wherein each of the first control message and the one or more second control messages further comprises at least one of: a frame control field, a duration field, a destination address (DA) field, a source address (SA) field, a control subtype field, a station (STA) information field, or a Cyclic Redundancy Check (CRC) field.

7. The apparatus of claim 6, wherein:
   the STA information field comprises information about Modulation-Coding Schemes used by the other apparatuses for transmissions of the first CSI report message and the one or more CSI report messages.

8. The apparatus of claim 6, wherein:
the DA field comprises a broadcast identifier (ID) associated with the other apparatuses,
the control subtype field indicates that the first control message comprises a Null Data Packet Announcement (NDPA) dedicated to the other apparatuses identified by the broadcast ID, and the transmitter is also configured to
transmit the sounding frame immediately following the first control message with the NDPA.

9. The apparatus of claim 6, wherein the control subtype field within one of the second control messages dedicated to one of the other apparatuses indicates that one of the one or more second control message represents one CSI poll from a set of CSI poll messages.

10. The apparatus of claim 1, wherein:
an Acknowledgement (ACK) field within one of the second control messages acknowledges to one of the other apparatuses successful reception of a most recently transmitted CSI computed at that other apparatus, and
the ACK field comprises a sequence number of the most recently transmitted CSI.

11. The apparatus of claim 1, wherein:
the first control message comprises an indication that the first CSI report message and the one or more CSI report messages are expected to be transmitted sequentially from each of the other apparatuses, or
the first control message comprises an indication that the CSIs computed by all the other apparatuses are expected to be communicated simultaneously as a Multi-User Multiple-Input Multiple-Output (MU-MIMO) transmission, and the receiver is also configured to
receive the MU-MIMO transmission.

12. The apparatus of claim 1, wherein:
the receiver is also configured to receive the computed CSI within multiple CSI segment MAC Protocol Data Units (MPDUs) of an Aggregated MAC Protocol Data Unit (A-MPDU), and
each of the CSI segment MPDUs does not require an acknowledgement to confirm successful reception of that CSI segment MPDU.

13. The apparatus of claim 1, wherein:
the transmitter is also configured to transmit, in response to the at least one segment, another control message to request another segment of the computed CSI, wherein the other control message comprises an indication about a number of remaining segments of the computed CSI to be transmitted; and
the receiver is also configured to receive the other segment, wherein the other segment was scheduled for transmission based on the indication about the number of remaining segments.

14. The apparatus of claim 1, wherein:
the receiver is also configured to receive at least one of an Acknowledgement (ACK) frame or a CSI Null frame transmitted from one of the other apparatuses acknowledging reception of one of the second control messages, if the first control message was not received at that apparatus, and
the CSI Null frame comprises at least one of a CSI sequence number set to the sequence number of that second control message, an indication that the CSI requested to be computed at that other apparatus is not transmitted within the CSI Null frame, a CSI feedback type field set to a default value, or an indication that a number of segments in which the CSI Null frame is transmitted is equal to one.

15. The apparatus of claim 1, wherein:
the transmission of the first control message comprises broadcasting the first control message to the other apparatuses, and
the transmission of each of the one or more second control messages is a unicast transmission to each one of the other apparatuses.

16. The apparatus of claim 1, wherein each of the first control message and the one or more second control messages comprises at least one of: a control frame of IEEE 802.11 wireless communications standards, or an Action No Acknowledgement frame of IEEE 802.11 wireless communications standards.

17. A method for communications, comprising:
transmitting a first control message prior to transmitting a sounding frame, the first control message requesting channel state information (CSI) to be computed, based on the sounding frame, at each of a plurality of apparatuses;
receiving a first CSI report message transmitted in response to the first control message from at least one of the apparatuses, wherein the first CSI report message comprises at least a segment of the computed CSI and at least an indication about a number of remaining segments of the computed CSI to be transmitted;
transmitting one or more second control messages, wherein each of the one or more second control messages requests a CSI report message with the computed CSI from a different one of the apparatuses, and wherein each of the first control message and the one or more second control messages comprises a sequence number used to match each of the one or more second control messages with the first control message; and
receiving one or more CSI report messages transmitted in response to the one or more second control messages.

18. The method of claim 17, wherein the sequence number comprises at least one of a dialog token as the one used in IEEE 802.11 action frames, or a time stamp derived from a timing synchronization function.

19. The method of claim 17, wherein:
each of the second control messages is transmitted in a different time period, and
each of the one or more CSI report messages is received immediately after transmitting one of the second control messages requesting that CSI report message and before transmitting any other of the second control messages.

20. The method of claim 17, further comprising:
transmitting the sounding frame immediately following transmission of the first control message.

21. The method of claim 17, wherein a station (STA) information field within the first control message comprises a STA identifier (ID) associated with each of the apparatuses.

22. The method of claim 17, wherein each of the first control message and the one or more second control messages further comprises at least one of: a frame control field, a duration field, a destination address (DA) field, a source address (SA) field, a control subtype field, a station (STA) information field, or a Cyclic Redundancy Check (CRC) field.

23. The method of claim 22, wherein:
the STA information field comprises information about Modulation-Coding Schemes used by the apparatuses for transmissions of the first CSI report message and the one or more CSI report messages.

24. The method of claim 22, wherein:
the DA field comprises a broadcast identifier (ID) associated with the apparatuses,
the control subtype field indicates that the first control message comprises a Null Data Packet Announcement (NDPA) dedicated to the apparatuses identified by the broadcast ID, and the method further comprising
transmitting the sounding frame immediately following the first control message with the NDPA.

25. The method of claim 22, wherein the control subtype field within one of the second control messages dedicated to one of the apparatuses indicates that one of the one or more second control message represents one CSI poll from a set of CSI poll messages.

26. The method of claim 17, wherein:
an Acknowledgement (ACK) field within one of the second control messages acknowledges to one of the apparatuses successful reception of a most recently transmitted CSI computed at that apparatus, and
the ACK field comprises a sequence number of the most recently transmitted CSI.

27. The method of claim 17, wherein:
the first control message comprises an indication that the first CSI report message and the one or more CSI report messages are expected to be transmitted sequentially from each of the apparatuses, or
the first control message comprises an indication that the CSIs computed by all the apparatuses are expected to be communicated simultaneously as a Multi-User Multiple-Input Multiple-Output (MU-MIMO) transmission, and the method further comprising
receiving the MU-MIMO transmission.

28. The method of claim 17, further comprising:
receiving the computed CSI within multiple CSI segment MAC Protocol Data Units (MPDUs) of an Aggregated MAC Protocol Data Unit (A-MPDU), wherein
each of the CSI segment MPDUs does not require an acknowledgement to confirm successful reception of that CSI segment MPDU.

29. The method of claim 17, further comprising:
transmitting, in response to the at least one segment, another control message to request another segment of the computed CSI, wherein the other control message comprises an indication about a number of remaining segments of the computed CSI to be transmitted; and
receiving the other segment, wherein the other segment was scheduled for transmission based on the indication about the number of remaining segments.

30. The method of claim 17, further comprising:
receiving at least one of an Acknowledgement (ACK) frame or a CSI Null frame transmitted from one of the apparatuses acknowledging reception of one of the second control messages, if the first control message was not received at that apparatus,
wherein the CSI Null frame comprises at least one of a CSI sequence number set to the sequence number of that second control message, an indication that the CSI requested to be computed at that apparatus is not transmitted within the CSI Null frame, a CSI feedback type field set to a default value, or an indication that a number of segments in which the CSI Null frame is transmitted is equal to one.

31. The method of claim 17, wherein:
the transmission of the first control message comprises broadcasting the first control message to the apparatuses, and
the transmission of each of the one or more second control messages is a unicast transmission to each one of the apparatuses.

32. The method of claim 17, wherein each of the first control message and the one or more second control messages comprises at least one of: a control frame of IEEE 802.11 wireless communications standards, or an Action No Acknowledgement frame of IEEE 802.11 wireless communications standards.

33. An apparatus for communications, comprising:
means for transmitting a first control message prior to transmitting a sounding frame, the first control message requesting channel state information (CSI) to be computed, based on the sounding frame, at each of a plurality of other apparatuses; and
means for receiving a first CSI report message transmitted in response to the first control message from at least one of the other apparatuses, wherein the first CSI report message comprises at least a segment of the computed CSI and at least an indication about a number of remaining segments of the computed CSI to be transmitted, and wherein:
the means for transmitting is further configured to transmit one or more second control messages, wherein each of the one or more second control messages requests a CSI report message with the computed CSI from a different one of the other apparatuses, and wherein each of the first control message and the one or more second control messages comprises a sequence number used to match each of the one or more second control messages with the first control message, and
the means for receiving is further configured to receive one or more CSI report messages transmitted in response to the one or more second control messages.

34. The apparatus of claim 33, wherein the sequence number comprises at least one of a dialog token as the one used in IEEE 802.11 action frames, or a time stamp derived from a timing synchronization function.

35. The apparatus of claim 33, wherein:
each of the second control messages is transmitted in a different time period, and
each of the one or more CSI report messages is received immediately after transmitting one of the second control messages requesting that CSI report message and before transmitting any other of the second control messages.

36. The apparatus of claim 33, wherein:
the means for transmitting is further configured to transmit the sounding frame immediately following transmission of the first control message.

37. The apparatus of claim 33, wherein a station (STA) information field within the first control message comprises a STA identifier (ID) associated with each of the other apparatuses.

38. The apparatus of claim 33, wherein each of the first control message and the one or more second control messages further comprises at least one of: a frame control field, a duration field, a destination address (DA) field, a source address (SA) field, a control subtype field, a station (STA) information field, or a Cyclic Redundancy Check (CRC) field.

39. The apparatus of claim 38, wherein:
the STA information field comprises information about Modulation-Coding Schemes used by the other apparatuses for transmissions of the first CSI report message and the one or more CSI report messages.

40. The apparatus of claim 38, wherein:
the DA field comprises a broadcast identifier (ID) associated with the other apparatuses,
the control subtype field indicates that the first control message comprises a Null Data Packet Announcement (NDPA) dedicated to the other apparatuses identified by the broadcast ID, and the means for transmitting is further configured to
transmit the sounding frame immediately following the first control message with the NDPA.

41. The apparatus of claim 38, wherein the control subtype field within one of the second control messages dedicated to one of the other apparatuses indicates that one of the one or more second control message represents one CSI poll from a set of CSI poll messages.

42. The apparatus of claim 33, wherein:
an Acknowledgement (ACK) field within one of the second control messages acknowledges to one of the other apparatuses successful reception of a most recently transmitted CSI computed at that other apparatus, and
the ACK field comprises a sequence number of the most recently transmitted CSI.

43. The apparatus of claim 33, wherein:
the first control message comprises an indication that the first CSI report message and the one or more CSI report messages are expected to be transmitted sequentially from each of the other apparatuses, or
the first control message comprises an indication that the CSIs computed by all the other apparatuses are expected to be communicated simultaneously as a Multi-User Multiple-Input Multiple-Output (MU-MIMO) transmission, and the means for receiving is further configured to
receive the MU-MIMO transmission.

44. The apparatus of claim 33, wherein:
the means for receiving is further configured to receive the computed CSI within multiple CSI segment MAC Protocol Data Units (MPDUs) of an Aggregated MAC Protocol Data Unit (A-MPDU), and
each of the CSI segment MPDUs does not require an acknowledgement to confirm successful reception of that CSI segment MPDU.

45. The apparatus of claim 33, wherein:
the means for transmitting is further configured to transmit, in response to the at least one segment, another control message to request another segment of the computed CSI, wherein the other control message comprises an indication about a number of remaining segments of the computed CSI to be transmitted; and
the means for receiving is further configured to receive the other segment, wherein the other segment was scheduled for transmission based on the indication about the number of remaining segments.

46. The apparatus of claim 33, wherein:
the means for receiving is further configured to receive at least one of an Acknowledgement (ACK) frame or a CSI Null frame transmitted from one of the other apparatuses acknowledging reception of one of the second control messages, if the first control message was not received at that other apparatus, and
the CSI Null frame comprises at least one of a CSI sequence number set to the sequence number of that second control message, an indication that the CSI requested to be computed at that other apparatus is not transmitted within the CSI Null frame, a CSI feedback type field set to a default value, or an indication that a number of segments in which the CSI Null frame is transmitted is equal to one.

47. The apparatus of claim 33, wherein:
the transmission of the first control message comprises broadcasting the first control message to the other apparatuses, and
the transmission of each of the one or more second control messages is a unicast transmission to each one of the other apparatuses.

48. The apparatus of claim 33, wherein each of the first control message and the one or more second control messages comprises at least one of: a control frame of IEEE 802.11 wireless communications standards, or an Action No Acknowledgement frame of IEEE 802.11 wireless communications standards.

49. A computer-readable storage device encoded with instructions executable to:
transmit a first control message prior to transmitting a sounding frame, the first control message requesting channel state information (CSI) to be computed, based on the sounding frame, at each of a plurality of apparatuses;
receive a first CSI report message transmitted in response to the first control message from at least one of the apparatuses, wherein the first CSI report message comprises at least a segment of the computed CSI and at least an indication about a number of remaining segments of the computed CSI to be transmitted;
transmit one or more second control messages, wherein each of the one or more second control messages requests a CSI report message with the computed CSI from a different one of the apparatuses, and wherein each of the first control message and the one or more second control messages comprises a sequence number used to match each of the one or more second control messages with the first control message; and
receive one or more CSI report messages transmitted in response to the one or more second control messages.

50. An access point, comprising:
at least one antenna;
a transmitter configured to transmit, via the at least one antenna, a first control message prior to transmitting a sounding frame, the first control message requesting channel state information (CSI) to be computed, based on the sounding frame, at each of a plurality of access terminals; and
a receiver configured to receive, via the at least one antenna, a first CSI report message transmitted in response to the first control message from at least one of the access terminals, wherein the first CSI report comprises at least a segment of the computed CSI and at least an indication about a number of remaining segments of the computed CSI to be transmitted, and wherein:
the transmitter is also configured to transmit, via the at least one antenna, one or more second control messages, wherein each of the one or more second control messages requests a CSI report message with the computed CSI from a different one of the access terminals, and wherein each of the first control message and the one or more second control messages comprises a sequence number used to match each of the one or more second control messages with the first control message, and
the receiver is also configured to receive, via the at least one antenna, one or more CSI report messages transmitted in response to the one or more second control messages.

51. An apparatus of a plurality of apparatuses for communications, comprising:
- a receiver configured to receive a first control message prior to receiving a sounding frame, the first control message requesting channel state information (CSI) to be computed, based on the sounding frame, at each of the apparatuses; and
- a transmitter configured to transmit, in response to the first control message, a CSI report message, if the apparatus is indicated in the first control message as the one responding first with the CSI among the apparatuses, wherein:
- the receiver is also configured to receive a second control message requesting the CSI report message with the computed CSI to be transmitted from the apparatus, if the apparatus is not indicated in the first control message as the one responding first with the CSI among the apparatuses, and
- the transmitter is also configured to transmit the CSI report message in response to the received second control message, wherein each of the first control message and the second control message comprises a sequence number used to match the second control message with the first control message, wherein the CSI report message comprises at least a segment of the computed CSI and at least an indication about a number of remaining segments of the computed CSI to be transmitted from the apparatus.

52. The apparatus of claim 51, wherein
the receiver is also configured to receive the sounding frame immediately after receiving the first control message, and the apparatus further comprising
a circuit configured to compute the CSI based on the sounding frame.

53. The apparatus of claim 51, wherein:
the received first control message comprises an indication that the CSIs computed by all the apparatuses are expected to be transmitted sequentially from each of the apparatuses, and
the transmitter is also configured to transmit, based on the indication, the CSI report message in a different time period than a time period for transmitting, by another of the apparatuses, another CSI report message with CSI computed at the other apparatus.

54. The apparatus of claim 51, wherein:
the received first control message comprises an indication that the CSIs computed by all the apparatuses are expected to be communicated simultaneously as a Multi-User Multiple-Input Multiple-Output (MU-MIMO) transmission, and
the transmitter is also configured to transmit, based on the indication in the MU-MIMO transmission, the CSI computed by the apparatus.

55. The apparatus of claim 51, wherein:
the CSI report message further comprises at least one of a frame control field, a duration field, a destination address (DA) field, a source address (SA) field, a control subtype field, a CSI feedback control field, a CSI feedback field with the computed CSI, or a Cyclic Redundancy Check (CRC) field, and
the control subtype field indicates that the CSI report message comprises the CSI computed at the apparatus.

56. The apparatus of claim 55, wherein a CSI feedback type sub-field of the CSI feedback control field comprises at least one of: information about a method used for computing the CSI stored in the CSI report message, information about a method used for compressing the CSI, information about a type of the apparatus and about a demodulation technology used at the apparatus, or information about a level of fidelity of a CRC sum stored in the CRC field.

57. The apparatus of claim 51, wherein:
the CSI report message further comprises at least one of a frame control field, a duration field, a destination address (DA) field, a source address (SA) field, a control subtype field, a CSI feedback control field, a CSI feedback field with the computed CSI, or a Cyclic Redundancy Check (CRC) field,
the CSI feedback control field comprises at least one of an indication whether the CSI report message comprises the computed CSI, a CSI sequence number, an indication about a size of the computed CSI, or the indication about a number of remaining segments of the computed CSI to be transmitted from the apparatus,
the CSI sequence number is set to a sequence number of the first control message, if the apparatus is indicated in the first control message as the one responding first with the CSI among the apparatuses, and
the CSI sequence number is set to a sequence number of the second control message, if the second control message is received at the apparatus.

58. The apparatus of claim 51, wherein:
the transmitter is also configured to transmit the computed CSI within multiple CSI segment MAC Protocol Data Units (MPDUs) of an Aggregated MAC Protocol Data Unit (A-MPDU), and
each of the CSI segment MPDUs does not require an acknowledgement response to confirm transmission of that CSI segment MPDU.

59. The apparatus of claim 51, wherein:
the receiver is also configured to receive another control message requesting another segment of the computed CSI to be transmitted, wherein the received other control message comprises an indication about a number of remaining segments of the computed CSI to be transmitted; and
the transmitter is also configured to transmit the other segment of the computed CSI, wherein the other segment was scheduled for transmission based on the indication about the number of remaining segments.

60. The apparatus of claim 51, wherein:
the received second control message does not comprise an indication about a number of remaining segments of the computed CSI to be transmitted, and
the transmitter is also configured to transmit, within the CSI report message based on the received second control message, a first of the segments of the computed CSI.

61. The apparatus of claim 51, wherein:
the receiver is also configured to receive a control message requesting other CSI to be transmitted from the apparatus; and
the transmitter is also configured to transmit an Acknowledgement (ACK) frame acknowledging reception of the control message, if another control message requesting the other CSI to be computed at each of the apparatuses was not received at the apparatus.

62. The apparatus of claim 51, wherein:
the receiver is also configured to receive a control message requesting other CSI to be transmitted from the apparatus;
the transmitter is also configured to transmit a CSI Null frame acknowledging reception of the control message, if another control message requesting the other CSI to be computed at each of the apparatuses was not received at the apparatus; and the CSI Null frame comprises at least one of a CSI sequence number set to the sequence number of the received control message, an indication that the other CSI is not transmitted within the CSI Null frame, a CSI feedback type field set to a default value, or an indication that a number of segments in which the CSI Null frame is transmitted is equal to one.

63. The apparatus of claim 51, wherein the CSI report message is transmitted in accordance with family of IEEE 802.11 wireless communications standards.

64. The apparatus of claim 51, wherein the CSI report message comprises at least one of a control frame of IEEE 802.11 wireless communications standards, or an Action No Acknowledgement frame of IEEE 802.11 wireless communications standards.

65. A method for communications, comprising:
receiving, at an apparatus of a plurality of apparatuses, a first control message prior to receiving a sounding frame, the first control message requesting channel state information (CSI) to be computed, based on the sounding frame, at each of the apparatuses;
transmitting, in response to the first control message, a CSI report message, if the apparatus is indicated in the first control message as the one responding first with the CSI among the apparatuses;
receiving a second control message requesting the CSI report message with the computed CSI to be transmitted from the apparatus, if the apparatus is not indicated in the first control message as the one responding first with the CSI among the apparatuses; and
transmitting the CSI report message in response to the received second control message, wherein each of the first control message and the second control message comprises a sequence number used to match the second control message with the first control message, wherein the CSI report message comprises at least a segment of the computed CSI and at least an indication about a number of remaining segments of the computed CSI to be transmitted from the apparatus.

66. The method of claim 65, further comprising:
receiving the sounding frame immediately after receiving the first control message; and
computing the CSI based on the sounding frame.

67. The method of claim 65, wherein:
the received first control message comprises an indication that the CSIs computed by all the apparatuses are expected to be transmitted sequentially from each of the apparatuses, and the method further comprising
transmitting, based on the indication, the CSI report message in a different time period than a time period for transmitting, by another of the apparatuses, another CSI report message with CSI computed at the other apparatus.

68. The method of claim 65, wherein:
the received first control message comprises an indication that the CSIs computed by all the apparatuses are expected to be communicated simultaneously as a Multi-User Multiple-Input Multiple-Output (MU-MIMO) transmission, and the method further comprising
transmitting, based on the indication in the MU-MIMO transmission, the CSI computed by the apparatus.

69. The method of claim 65, wherein:
the CSI report message further comprises at least one of a frame control field, a duration field, a destination address (DA) field, a source address (SA) field, a control subtype field, a CSI feedback control field, a CSI feedback field with the computed CSI, or a Cyclic Redundancy Check (CRC) field, and
the control subtype field indicates that the CSI report message comprises the CSI computed at the apparatus.

70. The method of claim 69, wherein a CSI feedback type sub-field of the CSI feedback control field comprises at least one of: information about a method used for computing the CSI stored in the CSI report message, information about a method used for compressing the CSI, information about a type of the apparatus and about a demodulation technology used at the apparatus, or information about a level of fidelity of a CRC sum stored in the CRC field.

71. The method of claim 65, wherein:
the CSI report message further comprises at least one of a frame control field, a duration field, a destination address (DA) field, a source address (SA) field, a control subtype field, a CSI feedback control field, a CSI feedback field with the computed CSI, or a Cyclic Redundancy Check (CRC) field,
the CSI feedback control field comprises at least one of an indication whether the CSI report message comprises the computed CSI, a CSI sequence number, an indication about a size of the computed CSI, or the indication about the number of remaining segments of the computed CSI to be transmitted from the apparatus,
the CSI sequence number is set to a sequence number of the first control message, if the apparatus is indicated in the first control message as the one responding first with the CSI among the apparatuses, and
the CSI sequence number is set to a sequence number of the second control message, if the second control message is received at the apparatus.

72. The method of claim 65, further comprising:
transmitting the computed CSI within multiple CSI segment MAC Protocol Data Units (MPDUs) of an Aggregated MAC Protocol Data Unit (A-MPDU), wherein
each of the CSI segment MPDUs does not require an acknowledgement response to confirm transmission of that CSI segment MPDU.

73. The method of claim 65, further comprising:
receiving another control message requesting another segment of the computed CSI to be transmitted, wherein the received other control message comprises an indication about a number of remaining segments of the computed CSI to be transmitted; and
transmitting the other segment of the computed CSI, wherein the other segment was scheduled for transmission based on the indication about the number of remaining segments.

74. The method of claim 65, wherein:
the received second control message does not comprise an indication about a number of remaining segments of the computed CSI to be transmitted, and the method further comprising
transmitting, within the CSI report message based on the received second control message, a first of the segments of the computed CSI.

75. The method of claim 65, further comprising:
receiving a control message requesting other CSI to be transmitted from the apparatus; and
transmitting an Acknowledgement (ACK) frame acknowledging reception of the control message, if another control message requesting the other CSI to be computed at each of the apparatuses was not received at the apparatus.

76. The method of claim 65, further comprising:
receiving a control message requesting other CSI to be transmitted from the apparatus; and
transmitting a CSI Null frame acknowledging reception of the control message, if another control message requesting the other CSI to be computed at each of the apparatuses was not received at the apparatus, wherein
the CSI Null frame comprises at least one of a CSI sequence number set to the sequence number of the received control message, an indication that the other CSI is not transmitted within the CSI Null frame, a CSI feedback type field set to a default value, or an indication that a number of segments in which the CSI Null frame is transmitted is equal to one.

77. The method of claim 65, wherein the CSI report message is transmitted in accordance with family of IEEE 802.11 wireless communications standards.

78. The method of claim 65, wherein the CSI report message comprises at least one of a control frame of IEEE 802.11 wireless communications standards, or an Action No Acknowledgement frame of IEEE 802.11 wireless communications standards.

79. An apparatus of a plurality of apparatuses for communications, comprising:
means for receiving a first control message prior to receiving a sounding frame, the first control message requesting channel state information (CSI) to be computed, based on the sounding frame, at each of the apparatuses; and
means for transmitting, in response to the first control message, a CSI report message, if the apparatus is indicated in the first control message as the one responding first with the CSI among the apparatuses, wherein:
the means for receiving is further configured to receive a second control message requesting the CSI report message with the computed CSI to be transmitted from the apparatus, if the apparatus is not indicated in the first control message as the one responding first with the CSI among the apparatuses, and
the means for transmitting is further configured to transmit the CSI report message in response to the received second control message, wherein each of the first control message and the second control message comprises a sequence number used to match the second control message with the first control message, wherein the CSI report message comprises at least a segment of the computed CSI and at least an indication about a number of remaining segments of the computed CSI to be transmitted from the apparatus.

80. The apparatus of claim 79, wherein
the means for receiving is further configured to receive the sounding frame immediately after receiving the first control message, and the apparatus further comprising
means for computing the CSI based on the sounding frame.

81. The apparatus of claim 79, wherein:
the received first control message comprises an indication that the CSIs computed by all the apparatuses are expected to be transmitted sequentially from each of the apparatuses, and
the means for transmitting is further configured to transmit, based on the indication, the CSI report message in a different time period than a time period for transmitting, by another of the apparatuses, another CSI report message with CSI computed at the other apparatus.

82. The apparatus of claim 79, wherein:
the received first control message comprises an indication that the CSIs computed by all the apparatuses are expected to be communicated simultaneously as a Multi-User Multiple-Input Multiple-Output (MU-MIMO) transmission, and
the means for transmitting is further configured to transmit, based on the indication in the MU-MIMO transmission, the CSI computed by the apparatus.

83. The apparatus of claim 79, wherein:
the CSI report message further comprises at least one of a frame control field, a duration field, a destination address (DA) field, a source address (SA) field, a control subtype field, a CSI feedback control field, a CSI feedback field with the computed CSI, or a Cyclic Redundancy Check (CRC) field, and
the control subtype field indicates that the CSI report message comprises the CSI computed at the apparatus.

84. The apparatus of claim 83, wherein a CSI feedback type sub-field of the CSI feedback control field comprises at least one of: information about a method used for computing the CSI stored in the CSI report message, information about a method used for compressing the CSI, information about a type of the apparatus and about a demodulation technology used at the apparatus, or information about a level of fidelity of a CRC sum stored in the CRC field.

85. The apparatus of claim 79, wherein:
the CSI report message further comprises at least one of a frame control field, a duration field, a destination address (DA) field, a source address (SA) field, a control subtype field, a CSI feedback control field, a CSI feedback field with the computed CSI, or a Cyclic Redundancy Check (CRC) field,
the CSI feedback control field comprises at least one of an indication whether the CSI report message comprises the computed CSI, a CSI sequence number, an indication about a size of the computed CSI, or the indication about the number of remaining segments of the computed CSI to be transmitted from the apparatus,
the CSI sequence number is set to a sequence number of the first control message, if the apparatus is indicated in the first control message as the one responding first with the CSI among the apparatuses, and
the CSI sequence number is set to a sequence number of the second control message, if the second control message is received at the apparatus.

86. The apparatus of claim 79, wherein:
the means for transmitting is further configured to transmit the computed CSI within multiple CSI segment MAC Protocol Data Units (MPDUs) of an Aggregated MAC Protocol Data Unit (A-MPDU), and
each of the CSI segment MPDUs does not require an acknowledgement response to confirm transmission of that CSI segment MPDU.

87. The apparatus of claim 79, wherein:
the means for receiving is further configured to receive another control message requesting another segment of the computed CSI to be transmitted, wherein the received other control message comprises an indication about a number of remaining segments of the computed CSI to be transmitted; and
the means for transmitting is further configured to transmit the other segment of the computed CSI, wherein the other segment was scheduled for transmission based on the indication about the number of remaining segments.

88. The apparatus of claim 79, wherein:
the received second control message does not comprise an indication about a number of remaining segments of the computed CSI to be transmitted, and the means for transmitting is further configured to transmit, within the CSI report message based on the received second control message, a first of the segments of the computed CSI.

89. The apparatus of claim 79, wherein:
the means for receiving is further configured to receive a control message requesting other CSI to be transmitted from the apparatus; and
the means for transmitting is further configured to transmit an Acknowledgement (ACK) frame acknowledging reception of the control message, if another control message requesting the other CSI to be computed at each of the apparatuses was not received at the apparatus.

90. The apparatus of claim 79, wherein:
the means for receiving is further configured to receive a control message requesting other CSI to be transmitted from the apparatus;
the means for transmitting is further configured to transmit a CSI Null frame acknowledging reception of the control message, if another control message requesting the other CSI to be computed at each of the apparatuses was not received at the apparatus; and
the CSI Null frame comprises at least one of a CSI sequence number set to the sequence number of the received control message, an indication that the other CSI is not transmitted within the CSI Null frame, a CSI feedback type field set to a default value, or an indication that a number of segments in which the CSI Null frame is transmitted is equal to one.

91. The apparatus of claim 79, wherein the CSI report message is transmitted in accordance with family of IEEE 802.11 wireless communications standards.

92. The apparatus of claim 79, wherein the CSI report message comprises at least one of a control frame of IEEE 802.11 wireless communications standards, or an Action No Acknowledgement frame of IEEE 802.11 wireless communications standards.

93. A computer-readable storage device encoded with instructions executable to:
receive, at an apparatus of a plurality of apparatuses, a first control message prior to receiving a sounding frame, the first control message requesting channel state information (CSI) to be computed, based on the sounding frame, at each of the apparatuses;
transmit, in response the first control message, a CSI report message with the computed CSI, if the apparatus is indicated in the first control message as the one responding first with the CSI among the apparatuses;
receive a second control message requesting the CSI report message with the computed CSI to be transmitted from the apparatus, if the apparatus is not indicated in the first control message as the one responding first with the CSI among the apparatuses; and
transmit the CSI report message in response to the received second control message, wherein each of the first control message and the second control message comprises a sequence number used to match the second control message with the first control message, wherein the CSI report message comprises at least a segment of the computed CSI and at least an indication about a number of remaining segments of the computed CSI to be transmitted from the apparatus.

94. An access terminal of a plurality of access terminals, comprising:
at least one antenna;
a receiver configured to receive, via the at least one antenna, a first control message prior to receiving a sounding frame, the first control message requesting channel state information (CSI) to be computed, based on the sounding frame, at each of the access terminals; and
a transmitter configured to transmit, via the at least one antenna in response to the first control message, a CSI report message, if the access terminal is indicated in the first control message as the one responding first with the CSI among the access terminals, wherein:
the receiver is also configured to receive, via the at least one antenna, a second control message requesting the CSI report message with the computed CSI to be transmitted from the access terminal, if the access terminal is not indicated in the first control message as the one responding first with the CSI among the access terminals, and
the transmitter is also configured to transmit, via the at least one antenna, the CSI report message in response to the received second control message, wherein each of the first control message and the second control message comprises a sequence number used to match the second control message with the first control message, wherein the CSI report message comprises at least a segment of the computed CSI and at least an indication about a number of remaining segments of the computed CSI to be transmitted from the apparatus.

* * * * *